United States Patent
Banerjea et al.

(10) Patent No.: US 10,356,777 B2
(45) Date of Patent: Jul. 16, 2019

(54) FREQUENCY HOPPING IN OFDMA WIRELESS NETWORKS

(71) Applicant: QUALCOMM Incorporated, San Diego, CA (US)

(72) Inventors: Raja Banerjea, San Jose, CA (US); Michael Richard Green, Needham, MA (US); Bin Tian, San Diego, CA (US); Vincent Knowles Jones, IV, Redwood City, CA (US); Youhan Kim, San Jose, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/486,083

(22) Filed: Apr. 12, 2017

(65) Prior Publication Data
US 2017/0303275 A1 Oct. 19, 2017

Related U.S. Application Data

(60) Provisional application No. 62/321,930, filed on Apr. 13, 2016.

(51) Int. Cl.
| | |
|---|---|
| *H04W 72/04* | (2009.01) |
| *H04B 1/713* | (2011.01) |
| *H04L 5/00* | (2006.01) |
| *H04W 84/12* | (2009.01) |
| *H04W 88/08* | (2009.01) |

(52) U.S. Cl.
CPC ........ *H04W 72/0446* (2013.01); *H04B 1/713* (2013.01); *H04L 5/0007* (2013.01); *H04W 84/12* (2013.01); *H04W 88/08* (2013.01)

(58) Field of Classification Search
CPC ...... H04B 1/713; H04L 5/0007; H04W 88/08; H04W 84/12; H04W 72/0446
See application file for complete search history.

(56) References Cited

U.S. PATENT DOCUMENTS

2016/0113034 A1* 4/2016 Seok ..................... H04W 74/04
370/329

OTHER PUBLICATIONS

International Search Report and Written Opinion—PCT/US2017/027376—ISA/EPO—dated Jul. 21, 2017.
Lightfoot L., et al., "Jamming-resilient subcarrier assignment for OFDMA based space-time coded systems," Electro/Information Technology, 2009, EIT'09, IEEE International Conference on, IEEE, Piscataway, NJ, USA, Jun. 7, 2009 (2009-86-87), XP831499358, pp. 260-265. ISBN: 978-1-4244-3354-4.

(Continued)

*Primary Examiner* — Jianye Wu
(74) *Attorney, Agent, or Firm* — Paradice and Li LLP/Qualcomm

(57) ABSTRACT

Method and systems are disclosed for qualifying a wireless device as frequency hopping device. In some aspects, an access point (AP) may determine a frequency hopping pattern for the wireless device, and then allocate a sequence of unique resource units to the wireless device based on the frequency hopping pattern. Each of the unique resource units include a different set of frequency subcarriers. The AP may receive a series of uplink orthogonal frequency-division multiple access (OFDMA) transmissions from the wireless device on the allocated sequence of unique resource units.

23 Claims, 14 Drawing Sheets

(56) References Cited

OTHER PUBLICATIONS

Zheng K., et al., "Performance and Analysis of COM-FH-OFDMA for Broadband Wireless Systems," Lecture Notes in Computer Science; Lect.Notes Computer, Network and Parallel Computing; Springer International Publishing, Cham, Jan. 1, 2006 (Jan. 1, 2006), XP019030898, pp. 978-989 pages. ISSN: 0302-9743 ISBN: 978-3-540-76785-5.

* cited by examiner

| TXOP | RU1 | RU2 | RU3 | RU4 | RU5 | RU6 | RU7 | RU8 | RU9 | RU10 | RU11 | RU12 | RU13 | RU14 | RU15 | RU16 | ... | RU37 |
|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | ... | 0 |
| 1 | 15 | 0 | 0 | 0 | 0 | 0 | 0 | 0 | 0 | 0 | 0 | 0 | 0 | 0 | 0 | 0 | ... | 0 |
| 2 | 14 | 15 | 0 | 0 | 0 | 0 | 0 | 0 | 0 | 0 | 0 | 0 | 0 | 0 | 0 | 0 | ... | 0 |
| 3 | 13 | 14 | 15 | 0 | 0 | 0 | 0 | 0 | 0 | 0 | 0 | 0 | 0 | 0 | 0 | 0 | ... | 0 |
| 4 | 12 | 13 | 14 | 15 | 0 | 0 | 0 | 0 | 0 | 0 | 0 | 0 | 0 | 0 | 0 | 0 | ... | 0 |
| 5 | 11 | 12 | 13 | 14 | 15 | 0 | 0 | 0 | 0 | 0 | 0 | 0 | 0 | 0 | 0 | 0 | ... | 0 |
| 6 | 10 | 11 | 12 | 13 | 14 | 15 | 0 | 0 | 0 | 0 | 0 | 0 | 0 | 0 | 0 | 0 | ... | 0 |
| 7 | 9 | 10 | 11 | 12 | 13 | 14 | 15 | 0 | 0 | 0 | 0 | 0 | 0 | 0 | 0 | 0 | ... | 0 |
| 8 | 8 | 9 | 10 | 11 | 12 | 13 | 14 | 15 | 0 | 0 | 0 | 0 | 0 | 0 | 0 | 0 | ... | 0 |
| 9 | 7 | 8 | 9 | 10 | 11 | 12 | 13 | 14 | 15 | 0 | 0 | 0 | 0 | 0 | 0 | 0 | ... | 0 |
| 10 | 6 | 7 | 8 | 9 | 10 | 11 | 12 | 13 | 14 | 15 | 0 | 0 | 0 | 0 | 0 | 0 | ... | 0 |
| 11 | 5 | 6 | 7 | 8 | 9 | 10 | 11 | 12 | 13 | 14 | 15 | 0 | 0 | 0 | 0 | 0 | ... | 0 |
| 12 | 4 | 5 | 6 | 7 | 8 | 9 | 10 | 11 | 12 | 13 | 14 | 15 | 0 | 0 | 0 | 0 | ... | 0 |
| 13 | 3 | 4 | 5 | 6 | 7 | 8 | 9 | 10 | 11 | 12 | 13 | 14 | 15 | 0 | 0 | 0 | ... | 0 |
| 14 | 2 | 3 | 4 | 5 | 6 | 7 | 8 | 9 | 10 | 11 | 12 | 13 | 14 | 15 | 0 | 0 | ... | 0 |
| 15 | 1 | 2 | 3 | 4 | 5 | 6 | 7 | 8 | 9 | 10 | 11 | 12 | 13 | 14 | 15 | 0 | ... | 0 |

RESOURCE UNIT ALLOCATION FOR SEQUENCE 701

| 901 | 902 | 903 | 904 | 905 | 906 |
|---|---|---|---|---|---|
| Length | Cascade Indication | HE-SIG-A Info | CP and LTF Type | Trigger Type | Trigger-dependent Common Info |

Figure 9A

| 911 | 912 | 913 | 914 | 915 | 916 | 917 |
|---|---|---|---|---|---|---|
| User Identifier | RU Allocation | Coding Type | MCS | DCM | Spatial Stream Allocation | Trigger-dependent Per User Info |

Figure 9B

FREQUENCY HOPPING IN OFDMA WIRELESS NETWORKS

CROSS-REFERENCE TO RELATED APPLICATIONS

This patent application claims priority to U.S. Provisional Patent Application No. 62/321,930 filed on Apr. 13, 2016 entitled FREQUENCY HOPPING IN OFDMA WIRELESS NETWORKS," assigned to the assignee hereof. The disclosure of the prior application is considered part of and is incorporated by reference in this patent application.

TECHNICAL FIELD

This disclosure relates generally to wireless networks, and specifically to employing frequency hopping techniques in wireless local area networks.

DESCRIPTION OF THE RELATED TECHNOLOGY

A wireless local area network (WLAN) may be formed by one or more access points (APs) that provide a shared wireless medium for use by a number of wireless devices or stations (STAs). Each AP, which may correspond to a Basic Service Set (BSS), periodically broadcasts beacon frames to enable any STAs within wireless range of the AP to establish and maintain a communication link with the WLAN. Wireless networks that operate in accordance with the IEEE 802.11 family of standards may be referred to as Wi-Fi networks, and wireless devices that transmit signals according to communication protocols specified by the IEEE 802.11 family of standards may be referred to as Wi-Fi devices.

The wireless range of a Wi-Fi device may be related to its transmission power level. For example, wireless signals transmitted at higher power levels typically travel farther than wireless signals transmitted at lower power levels. Many governmental regulations impose a power spectral density limit on the transmission power of wireless devices. These power spectral density limits may undesirably limit the range of Wi-Fi devices.

SUMMARY

The systems, methods and devices of this disclosure each have several innovative aspects, no single one of which is solely responsible for the desirable attributes disclosed herein.

One innovative aspect of the subject matter described in this disclosure can be implemented in a Wi-Fi network to increase the wireless range of Wi-Fi devices without violating power spectral density limits imposed by governmental regulations. In some implementations, a wireless device may employ frequency hopping techniques during OFDMA transmissions to qualify as a frequency hopping device. Because many governmental regulations impose less stringent power spectral density limits on frequency hopping devices than on Wi-Fi devices, qualifying the wireless device as a frequency hopping device during OFDMA transmissions may allow the wireless device to transmit data at the higher power levels associated with frequency hopping devices. In this manner, aspects of the present disclosure may increase the wireless range of Wi-Fi devices without violating power spectral density limits imposed by governmental regulations.

In some implementations, an access point (AP) can include one or more processors and a memory storing instructions. The instructions can be executed by the one or more processors to cause the AP to qualify a wireless device as frequency hopping device by determining a frequency hopping pattern for the wireless device; allocating a sequence of unique resource units to the wireless device based on the frequency hopping pattern, each of the unique resource units including a different set of frequency subcarriers; and receiving, from the wireless device, a series of uplink orthogonal frequency-division multiple access (OFDMA) transmissions on the allocated sequence of unique resource units during a sequence period.

Another innovative aspect of the subject matter described in this disclosure can be implemented as a method for qualifying a wireless device as frequency hopping device. The method can include determining a frequency hopping pattern for the wireless device; allocating a sequence of unique resource units to the wireless device based on the frequency hopping pattern, each of the unique resource units including a different set of frequency subcarriers; and receiving, from the wireless device, a series of uplink orthogonal frequency-division multiple access (OFDMA) transmissions on the allocated sequence of unique resource units during a sequence period.

Another innovative aspect of the subject matter described in this disclosure can be implemented in a non-transitory computer-readable medium. The non-transitory computer-readable medium can comprise instructions that, when executed by one or more processors of an AP, cause the AP to qualify a wireless device as frequency hopping device by performing operations that include determining a frequency hopping pattern for the wireless device; allocating a sequence of unique resource units to the wireless device based on the frequency hopping pattern, each of the unique resource units including a different set of frequency subcarriers; and receiving, from the wireless device, a series of uplink orthogonal frequency-division multiple access (OFDMA) transmissions on the allocated sequence of unique resource units during a sequence period.

Another innovative aspect of the subject matter described in this disclosure can be implemented in an apparatus. The apparatus can include means for determining a frequency hopping pattern for the wireless device; means for allocating a sequence of unique resource units to the wireless device based on a frequency hopping pattern, each of the unique resource units including a different set of frequency subcarriers; and means for receiving, from the wireless device, a series of uplink orthogonal frequency-division multiple access (OFDMA) transmissions on the allocated sequence of unique resource units during a sequence period.

Another innovative aspect of the subject matter described in this disclosure can be implemented in a wireless station. The wireless station can include one or more processors and a memory. The memory can store instructions that, when executed by the one or more processors, cause the wireless station to qualify as a frequency hopping device by: receiving a frequency hopping pattern; receiving an allocation of a sequence of unique resource units based on the frequency hopping pattern, each of the unique resource units including a different set of frequency subcarriers; and transmitting a series of orthogonal frequency-division multiple access (OFDMA) data transmissions on the allocated sequence of unique resource units during a sequence period. In some aspects, the wireless station can receive a trigger frame that allocates the sequence of unique resource units to the wireless station and indicates that the wireless station is to successively frequency hop between more than a specified number of the unique resource units. The trigger frame also may contain one of an indication that the wireless station is to dwell on each of the unique resource units for less than a duration and an indication that an accumulated dwell time in the unique resource units is to be no more than a time period greater than a duration of the sequence of unique resource units.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 7B shows an illustrative table depicting an example construction of one of the resource unit sequences of FIG. 7A.

FIG. 9A shows an example Common Info field.

FIG. 9B shows an example Per User Info field.

Like reference numerals refer to corresponding parts throughout the drawing figures.

DETAILED DESCRIPTION

Figure 1:
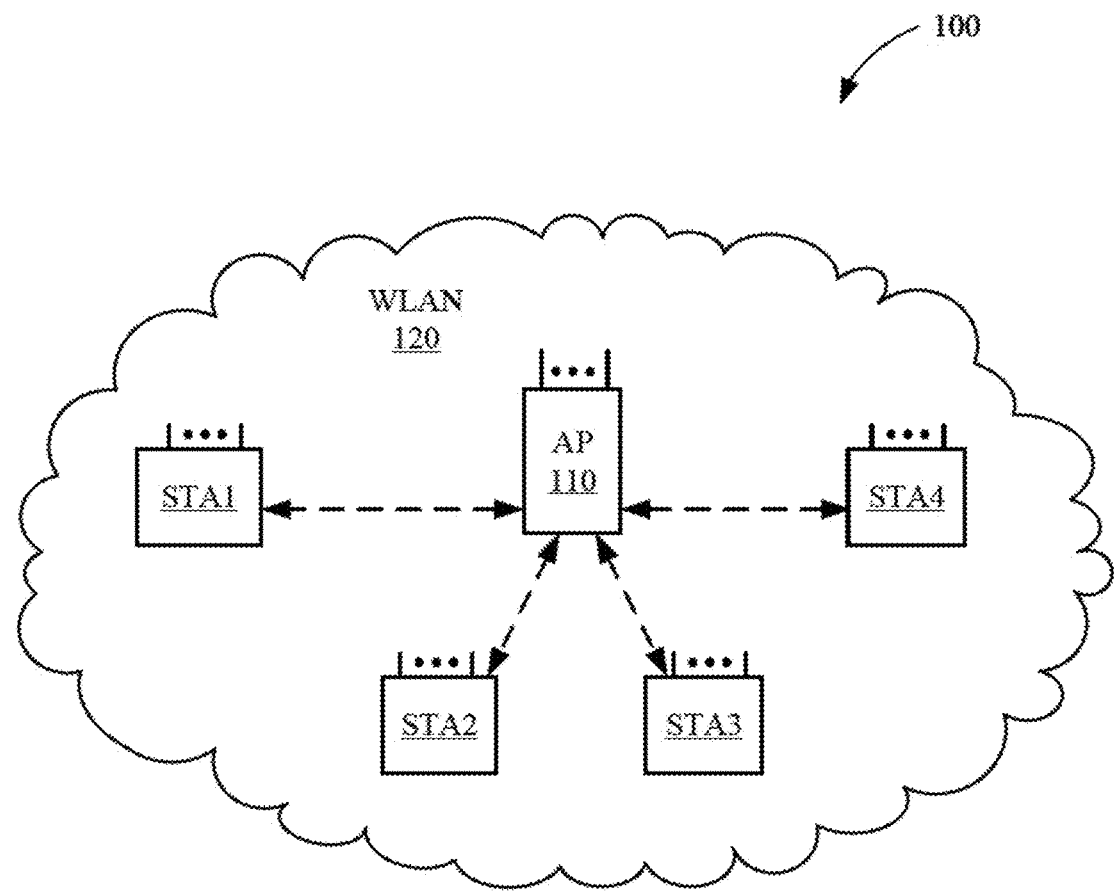
FIG. 1 shows a block diagram of an example wireless system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HS-DPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The range of a wireless device may be based at least in part on its transmission power and transmission bandwidth. For example, wireless signals transmitted at higher power levels typically travel farther than wireless signals transmitted at lower power levels, and wireless signals transmitted using a relatively wide bandwidth typically travel farther than wireless signals transmitted using a relatively narrow bandwidth. Governmental regulations that impose power spectral density limits on the transmission power of wireless devices may undesirably limit the range of wireless devices. In many regions of the world, the power spectral density limits imposed on frequency hopping devices are less stringent than the power spectral density limits imposed on Wi-Fi devices. For example, the European Telecommunications Standards Institute (ETSI) imposes a 14 dBm power limit on Wi-Fi devices that transmit data on a 2 MHz resource unit (RU) using orthogonal frequency-division multiple access (OFDMA) communications, and imposes a 20 dBm power limit on frequency hopping devices that transmit data on a 2 MHz channel In other words, while a frequency hopping device may transmit data using a 2 MHz bandwidth at power levels up to 20 dBm, a Wi-Fi device transmitting data using a 2 MHz bandwidth is limited 14 dBm.

Implementations of the subject matter described in this disclosure may allow a Wi-Fi device to transmit wireless signals at higher power levels by qualifying the Wi-Fi device as a frequency hopping device. More specifically, in accordance with aspects of the present disclosure, a Wi-Fi device can qualify as a frequency hopping device by using frequency hopping techniques during OFDMA transmissions. In some implementations, an access point (AP) can determine a frequency hopping schedule that is compliant with applicable power spectral density limits imposed on frequency hopping devices, and then announce or otherwise indicate the determined frequency hopping schedule to a number of Wi-Fi devices associated with the AP. The AP also can allocate resource units (RUs) to the number of Wi-Fi devices for uplink (UL) data transmissions based on the determined frequency hopping schedule. The Wi-Fi devices can receive the determined frequency hopping schedule and the allocation of RUs, and thereafter transmit UL data based on the determined frequency hopping schedule and the allocated RUs.

As used herein, the term "associated AP" refers to an AP with which a given STA is associated (such as there is an established communication channel or link between the AP and the given STA). The term "non-associated AP" refers to an AP with which a given STA is not associated (such as there is not an established communication channel or link between the AP and the given STA, and thus the AP and the given STA may not yet exchange data frames). The term "associated STA" refers to a STA that is associated with a given AP, and the term "non-associated STA" refers to a STA that is not associated with the given AP. Additionally, the term "narrowband" may refer to a bandwidth that is less than 20 MHz (such as a 2 MHz bandwidth, a 4 MHz bandwidth, an 8 MHz bandwidth, and a 16 MHz bandwidth), and the term "wideband" may refer to a bandwidth that is greater than or equal to 20 MHz (such as a primary 20 MHz channel, a secondary 20 MHz channel, a secondary 40 MHz channel, a secondary 80 MHz channel, and so on).

FIG. 1 shows a block diagram of an example wireless system 100. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that the WLAN 120 may be formed by any number of access points such as the AP 110. The AP 110 is assigned a unique MAC address that is programmed therein by, for example, the manufacturer of the access point. Similarly, each of the stations STA1-STA4 is also assigned a unique MAC address. In some aspects, the AP 110 may assign an association identification (AID) value to each of the stations STA1-STA4, for example, so that the AP 110 may identify the stations STA1-STA4 using their assigned AID values.

In some implementations, the WLAN 120 may allow for multiple-input multiple-output (MIMO) communications between the AP 110 and the stations STA1-STA4. The MIMO communications may include single-user MIMO (SU-MIMO) and multi-user MIMO (MU-MIMO) communications. In some aspects, the WLAN 120 may utilize a multiple channel access mechanism such as, for example, an orthogonal frequency-division multiple access (OFDMA) mechanism. Although the WLAN 120 is depicted in FIG. 1 as an infrastructure basic service set (BSS), in other implementations, the WLAN 120 may be an independent basic service set (IBSS), an ad-hoc network, or a peer-to-peer (P2P) network (such as operating according to the Wi-Fi Direct protocols).

Each of the stations STA1-STA4 may be any suitable wireless device including, for example, a cell phone, personal digital assistant (PDA), tablet device, laptop computer, or the like. Each of the stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some implementations, each of the stations STA1-STA4 may include one or more transceivers, one or more processing resources, one or more memory resources, and a power source (such as a battery). The memory resources may include a non-transitory computer-readable medium (such as one or more nonvolatile memory elements, such as EPROM, EEPROM, Flash memory, a hard drive, etc.) that stores instructions for performing operations described below with respect to FIGS. 10-12.

The AP 110 may be any suitable device that allows one or more wireless devices to connect to a network (such as a local area network (LAN), wide area network (WAN), metropolitan area network (MAN), or the Internet) via the AP 110 using wireless communications such as, for example, Wi-Fi, Bluetooth, and cellular communications. In some implementations, the AP 110 may include one or more transceivers, one or more processing resources, one or more memory resources, and a power source. The memory resources may include a non-transitory computer-readable medium (such as one or more nonvolatile memory elements, such as EPROM, EEPROM, Flash memory, a hard drive, etc.) that stores instructions for performing operations described below with respect to FIGS. 10-12.

For the stations STA1-STA4 and the AP 110, the one or more transceivers may include Wi-Fi transceivers, Bluetooth transceivers, cellular transceivers, and any other suitable radio frequency (RF) transceivers (not shown for simplicity) to transmit and receive wireless communication signals. Each transceiver may communicate with other wireless devices in distinct operating frequency bands, using distinct communication protocols, or both. For example, the Wi-Fi transceiver may communicate within a 900 MHz frequency band, a 2.4 GHz frequency band, a 5 GHz frequency band, and a 60 MHz frequency band in accordance with the IEEE 802.11 standards. The Bluetooth transceiver may communicate within the 2.4 GHz frequency band in accordance with the standards provided by the Bluetooth Special Interest Group (SIG), in accordance with the IEEE 802.15 standards, or both. The cellular transceiver may communicate within various RF frequency bands in accordance with any suitable cellular communications standard.

Figure 2:
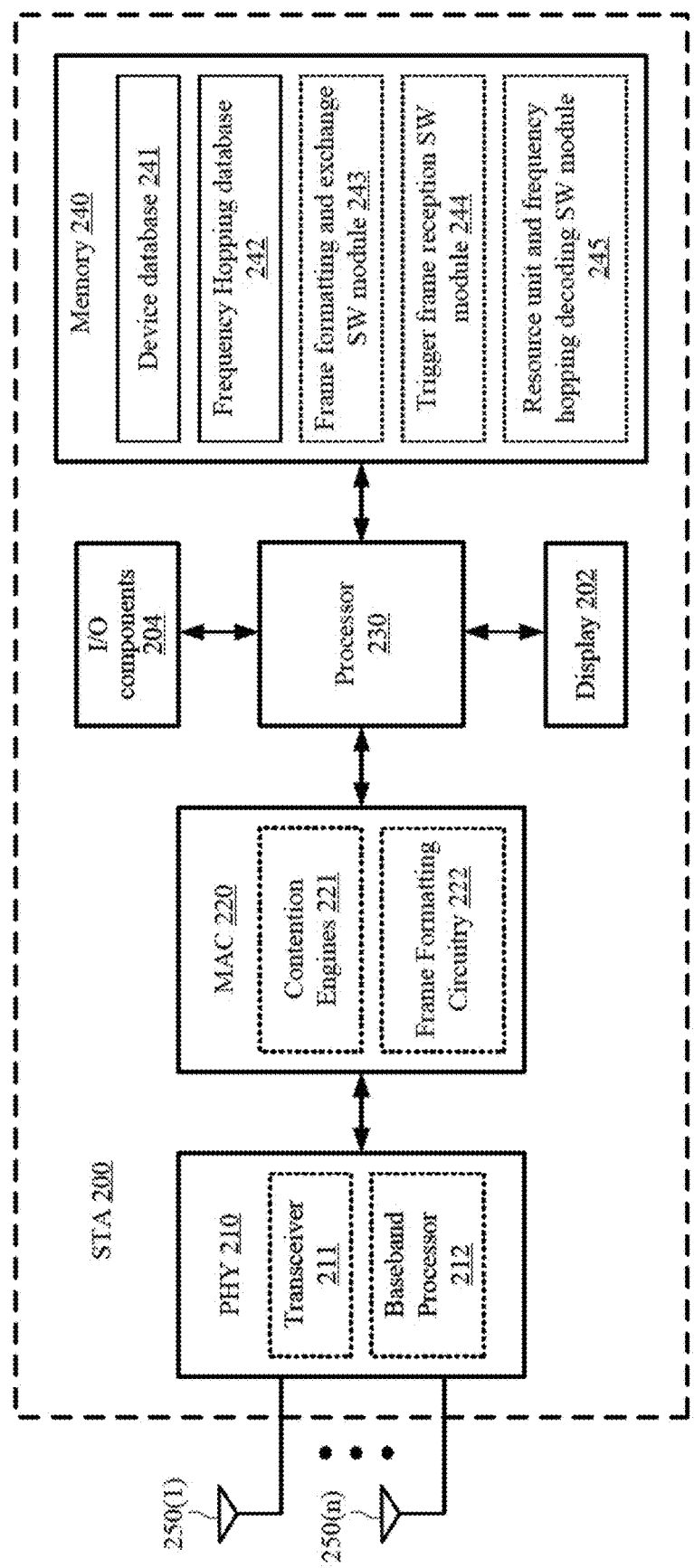
FIG. 2 shows a block diagram of an example wireless station.

FIG. 2 shows a block diagram of an example wireless station (STA) 200. In some implementations, the STA 200 may be one example of one or more of the wireless stations STA1-STA4 of FIG. 1. The STA 200 may include a display 202, input/output (I/O) components 204, a physical-layer device (PHY) 210, a MAC 220, a processor 230, a memory 240, and a number of antennas 250(1)-250(n). The display 202 may be any suitable display or screen upon which items may be presented to a user (such as for viewing, reading, or watching). In some aspects, the display 202 may be a touch-sensitive display that allows for user interaction with the STA 200 and that allows the user to control one or more operations of the STA 200. The I/O components 204 may be or include any suitable mechanism, interface, or device to receive input (such as commands) from the user and to provide output to the user. For example, the I/O components 204 may include (but are not limited to) a graphical user interface, keyboard, mouse, microphone, speakers, and so on.

The PHY 210 may include at least a number of transceivers 211 and a baseband processor 212. The transceivers 211 may be coupled to the antennas 250(1)-250(n), either directly or through an antenna selection circuit (not shown for simplicity). The transceivers 211 may be used to transmit signals to and receive signals from the AP 110 and other STAs (see also FIG. 1), and may be used to scan the surrounding environment to detect and identify nearby access points and other STAs (such as within wireless range of the STA 200). Although not shown in FIG. 2 for simplicity, the transceivers 211 may include any number of transmit chains to process and transmit signals to other wireless devices via the antennas 250(1)-250(n), and may include any number of receive chains to process signals received from the antennas 250(1)-250(n). In some implementations, the STA 200 may be configured for MIMO operations. The MIMO operations may include SU-MIMO operations and MU-MIMO operations. The STA 200 also may be configured for OFDMA communications and other suitable multiple access mechanisms, for example, as may be provided by the IEEE 802.11ax specification.

The baseband processor 212 may be used to process signals received from the processor 230 or the memory 240 (or both) and to forward the processed signals to the transceivers 211 for transmission via one or more of the antennas 250(1)-250(n). The baseband processor 212 also may be used to process signals received from one or more of the antennas 250(1)-250(n) via the transceivers 211 and to forward the processed signals to the processor 230 or the memory 240 (or both).

The MAC 220 may include at least a number of contention engines 221 and frame formatting circuitry 222. The contention engines 221 may contend for access to a shared wireless medium (or contend for access to one or more resource units), and also may store packets for transmission over the shared wireless medium (such as using one or more resource units). The STA 200 may include one or more contention engines 221 for each of a plurality of different access categories. In other implementations, the contention engines 221 may be separate from the MAC 220. For still other implementations, the contention engines 221 may be implemented as one or more software modules (such as stored in the memory 240 or stored in a memory provided within the MAC 220) containing instructions that, when executed by the processor 230, perform the functions of the contention engines 221.

The frame formatting circuitry 222 may be used to create and format frames received from the processor 230 (such as by adding MAC headers to PDUs provided by the processor 230), and may be used to re-format frames received from the PHY 210 (such as by stripping MAC headers from frames received from the PHY 210). Although the example of FIG. 2 depicts the MAC 220 coupled to the memory 240 via the processor 230, in other implementations, the PHY 210, the MAC 220, the processor 230, and the memory 240 may be connected using one or more buses (not shown for simplicity).

The processor 230 may be any suitable one or more processors capable of executing scripts or instructions of one or more software programs stored in the STA 200 (such as within the memory 240). In some implementations, the processor 230 may be or include one or more microprocessors providing the processor functionality and external memory providing at least a portion of machine-readable media. In other implementations, the processor 230 may be or include an Application Specific Integrated Circuit (ASIC) with the processor, the bus interface, the user interface, and at least a portion of the machine-readable media integrated into a single chip. In some other implementations, the processor 230 may be or include one or more Field Programmable Gate Arrays (FPGAs) or Programmable Logic Devices (PLDs).

The memory 240 may include a device database 241 that stores profile information for the STA 200 and for a number of other wireless devices (such as APs and other STAs). The profile information for the STA 200 may include, for example, its MAC address, the basic service set identification (BSSID) of the basic service set to which the STA 200 belongs, its bandwidth capabilities, its supported channel access mechanisms, its supported data rates, and so on. The profile information for a particular AP may include, for example, the AP's BSSID, MAC address, channel information, frequency hopping schedule, received signal strength indicator (RSSI) values, goodput values, channel state information (CSI), supported data rates, connection history with the STA 200, a trustworthiness value of the AP (such as indicating a level of confidence about the AP's location, etc.), and any other suitable information pertaining to or describing the operation of the AP.

The memory 240 also may include a frequency hopping database 242. The frequency hopping database 242 may store one or more frequency hopping patterns, a frequency hopping schedule (such as provided by an AP), one or more sequences of resource units (such as allocated based on the frequency hopping schedule), a maximum resource unit dwell time, an accumulated sequence period dwell time, or any other suitable information pertaining to or describing frequency hopping techniques employed by the STA 200.

The memory 240 may also include a non-transitory computer-readable medium (such as one or more nonvolatile memory elements, such as EPROM, EEPROM, Flash memory, a hard drive, and so on) that may store at least the following software (SW) modules:

a frame formatting and exchange software module 243 to facilitate the creation and exchange of any suitable frames (such as data frames, action frames, control frames, and management frames) between the STA 200 and other wireless devices, for example, as described below for one or more operations of FIGS. 10-12;

a trigger frame reception software module 244 to receive trigger frames, to determine whether the trigger frames allocate resource units (RUs) to the STA 200, and to determine whether the trigger frames indicate a frequency hopping schedule, for example, as described below for one or more operations of FIGS. 10-12; and a resource unit and frequency hopping decoding software module 245 to determine which (if any) RUs are allocated to the STA 200, and to decode frequency hopping schedules and RU sequences for the STA 200, for example, as described below for one or more operations of FIGS. 10-12.

Each software module includes instructions that, when executed by the processor 230, cause the STA 200 to perform the corresponding functions. The non-transitory computer-readable medium of the memory 240 thus includes instructions for performing all or a portion of the operations described below with respect to FIGS. 10-12.

The processor 230 may execute the frame formatting and exchange software module 243 to facilitate the creation and exchange of any suitable frames (such as data frames, action frames, control frames, and management frames) between the STA 200 and other wireless devices. The processor may execute the trigger frame reception software module 244 to receive trigger frames, to determine whether the trigger frames allocate resource units (RUs) to the STA 200, and to determine whether the trigger frames indicate a frequency hopping schedule. The processor may execute the resource unit and frequency hopping decoding software module 245 to determine which (if any) RUs are allocated to the STA 200, and to decode frequency hopping schedules and RU sequences for the STA 200.

Figure 3:
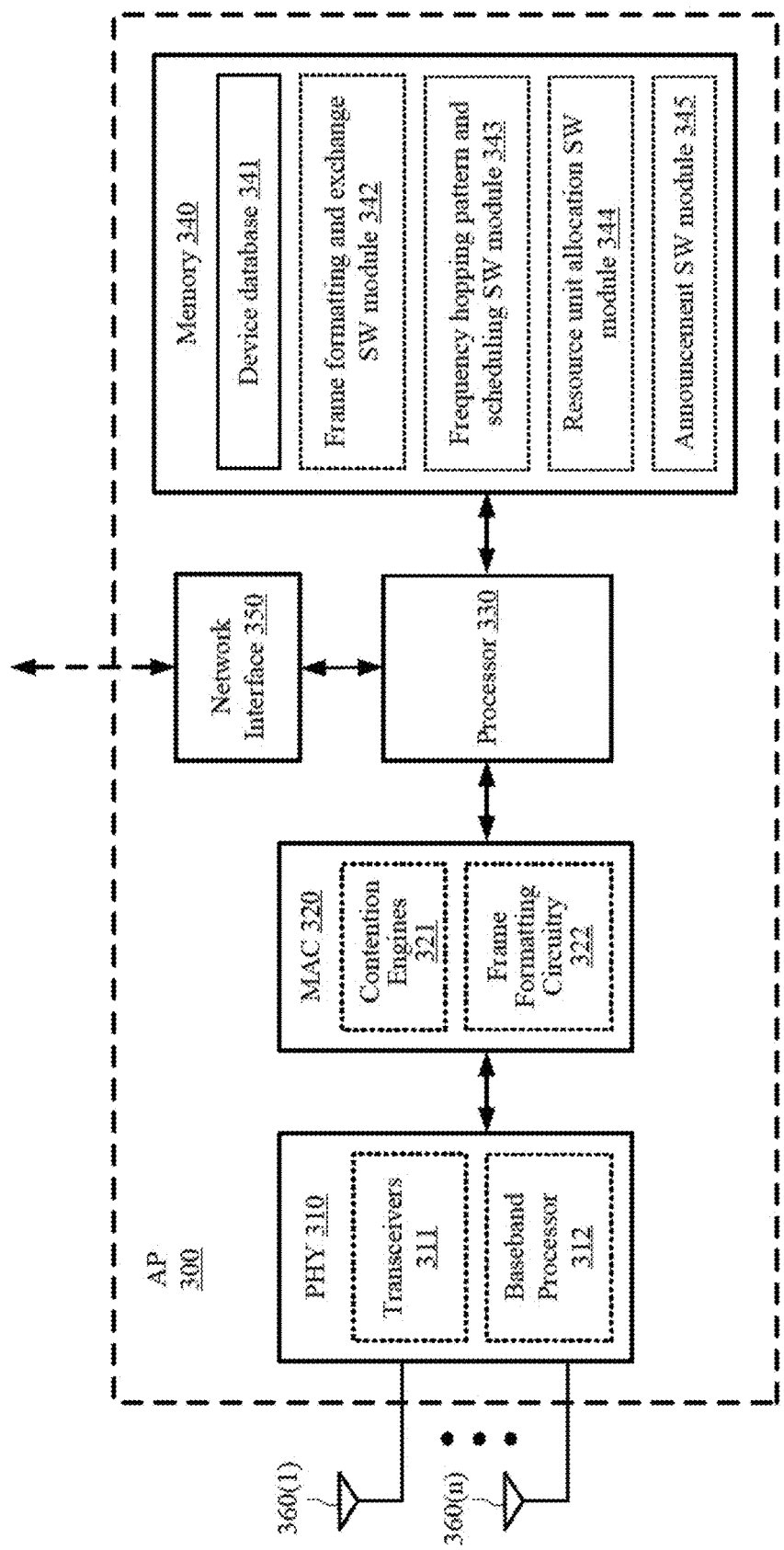
FIG. 3 shows a block diagram of an example access point.

FIG. 3 shows a block diagram of an example access point (AP) 300. In some implementations, the AP 300 may be one example of the AP 110 of FIG. 1. The AP 300 may include a PHY 310, a MAC 320, a processor 330, a memory 340, a network interface 350, and a number of antennas 360(1)-360(n). The PHY 310 may include at least a number of transceivers 311 and a baseband processor 312. The transceivers 311 may be coupled to the antennas 360(1)-360(n), either directly or through an antenna selection circuit (not shown for simplicity). The transceivers 311 may be used to communicate wirelessly with one or more STAs, with one or more other APs, and with other suitable devices. Although not shown in FIG. 3 for simplicity, the transceivers 311 may include any number of transmit chains to process and transmit signals to other wireless devices via the antennas 360(1)-360(n), and may include any number of receive chains to process signals received from the antennas 360

(1)-360(n). In some implementations, the AP 300 may be configured for MIMO operations such as SU-MIMO operations and MU-MIMO operations. The AP 300 also may be configured for OFDMA communications and other suitable multiple access mechanisms, for example, as may be provided by the IEEE 802.11ax specification.

The baseband processor 312 may be used to process signals received from the processor 330 or the memory 340 (or both) and to forward the processed signals to the transceivers 311 for transmission via one or more of the antennas 360(1)-360(n). The baseband processor 312 also may be used to process signals received from one or more of the antennas 360(1)-360(n) via the transceivers 311 and to forward the processed signals to the processor 330 or the memory 340 (or both).

The network interface 350 may be used to communicate with a WLAN server (not shown for simplicity) either directly or via one or more intervening networks and to transmit signals.

The MAC 320 may include at least a number of contention engines 321 and frame formatting circuitry 322. The contention engines 321 may contend for access to the shared wireless medium, and also may store packets for transmission over the shared wireless medium. In some implementations, the AP 300 may include one or more contention engines 321 for each of a plurality of different access categories. In other implementations, the contention engines 321 may be separate from the MAC 320. For still other implementations, the contention engines 321 may be implemented as one or more software modules (such as stored in the memory 340 or within a memory provided within the MAC 320) containing instructions that, when executed by the processor 330, perform the functions of the contention engines 321.

The frame formatting circuitry 322 may be used to create and format frames received from the processor 330 (such as by adding MAC headers to PDUs provided by the processor 330), and may be used to re-format frames received from the PHY 310 (such as by stripping MAC headers from frames received from the PHY 310). Although the example of FIG. 3 depicts the MAC 320 coupled to the memory 340 via the processor 330, in other implementations, the PHY 310, the MAC 320, the processor 330, and the memory 340 may be connected using one or more buses (not shown for simplicity).

The processor 330 may be any suitable one or more processors capable of executing scripts or instructions of one or more software programs stored in the AP 300 (such as within the memory 340). In some implementations, the processor 330 may be or include one or more microprocessors providing the processor functionality and external memory providing at least a portion of machine-readable media. In other implementations, the processor 330 may be or include an Application Specific Integrated Circuit (ASIC) with the processor, the bus interface, the user interface, and at least a portion of the machine-readable media integrated into a single chip. In some other implementations, the processor 330 may be or include one or more Field Programmable Gate Arrays (FPGAs) or Programmable Logic Devices (PLDs).

The memory 340 may include a device database 341 that stores profile information for a plurality of STAs. The profile information for a particular STA may include, for example, its MAC address, supported data rates, connection history with the AP 300, one or more RUs allocated to the STA, a frequency hopping pattern of the STA, one or more RU sequences allocated to the STA, and any other suitable information pertaining to or describing the operation of the STA.

The memory 340 also may include a non-transitory computer-readable medium (such as one or more nonvolatile memory elements, such as EPROM, EEPROM, Flash memory, a hard drive, and so on) that may store at least the following software (SW) modules:

- a frame formatting and exchange software module 342 to facilitate the creation and exchange of any suitable frames (such as data frames, action frames, control frames, and management frames) between the AP 300 and other wireless devices, for example, as described below for one or more operations of FIGS. 10-12;
- a frequency hopping pattern and scheduling SW module 343 to select a unique frequency hopping pattern for each of a number of wireless devices and to determine or select a frequency hopping schedule based on the unique frequency hopping patterns, for example, as described below for one or more operations of FIGS. 10-12;
- a resource unit (RU) allocation software module 344 to allocate unique sequences of RUs to the wireless devices (such as based on frequency hopping schedules or unique frequency hopping patterns), for example, as described below for one or more operations of FIGS. 10-12; and
- an announcement software module 345 to announce or otherwise indicate the frequency hopping patterns, the frequency hopping schedule, and the allocation of unique sequences of RUs to the wireless devices, for example, as described below for one or more operations of FIGS. 10-12.

Each software module includes instructions that, when executed by the processor 330, cause the AP 300 to perform the corresponding functions. The non-transitory computer-readable medium of the memory 340 thus includes instructions for performing all or a portion of the operations described below with respect to FIGS. 10-12.

The processor 330 may execute the frame formatting and exchange software module 342 to facilitate the creation and exchange of any suitable frames (such as data frames, action frames, control frames, and management frames) between the AP 300 and other wireless devices. The processor 330 may execute the frequency hopping pattern and scheduling SW module 343 to select a unique frequency hopping pattern for each of a number of wireless devices that may qualify the wireless devices as frequency hopping devices, and to determine or select a frequency hopping schedule based on the unique frequency hopping patterns. The processor 330 may execute the resource unit allocation software module 344 to allocate unique sequences of RUs to the wireless devices (such as based on frequency hopping schedules or unique frequency hopping patterns), for example, to allow the wireless devices to transmit UL OFDMA communications using frequency hopping techniques. The processor 330 may execute the announcement software module 345 to announce or otherwise indicate the frequency hopping patterns, the frequency hopping schedule, and the allocation of unique sequences of RUs to the wireless devices.

As mentioned above, the IEEE 802.11ax specification may introduce multiple access mechanisms, such as an orthogonal frequency-division multiple access (OFDMA) mechanism, to allow multiple STAs to transmit and receive data on a shared wireless medium at the same time. For a wireless network using OFDMA, the available frequency spectrum may be divided into a plurality of resource units (RUs) each including a number of different frequency subcarriers, and different RUs may be allocated or assigned to different wireless devices (such as STAs) at a given point in time. In this manner, multiple wireless devices may concurrently transmit data on the wireless medium using their assigned RUs or frequency subcarriers. Because each RU may include a subset of the available frequency subcarriers that is much smaller than the overall frequency spectrum of the wireless medium, the IEEE 802.11ax specification may allow wireless devices to transmit data to each other using smaller channel bandwidths of 2 MHz, 4 MHz, 8 MHz, and 16 MHz (such as compared to a primary 20 MHz channel and one or more secondary channels of varying bandwidths).

Figure 4:
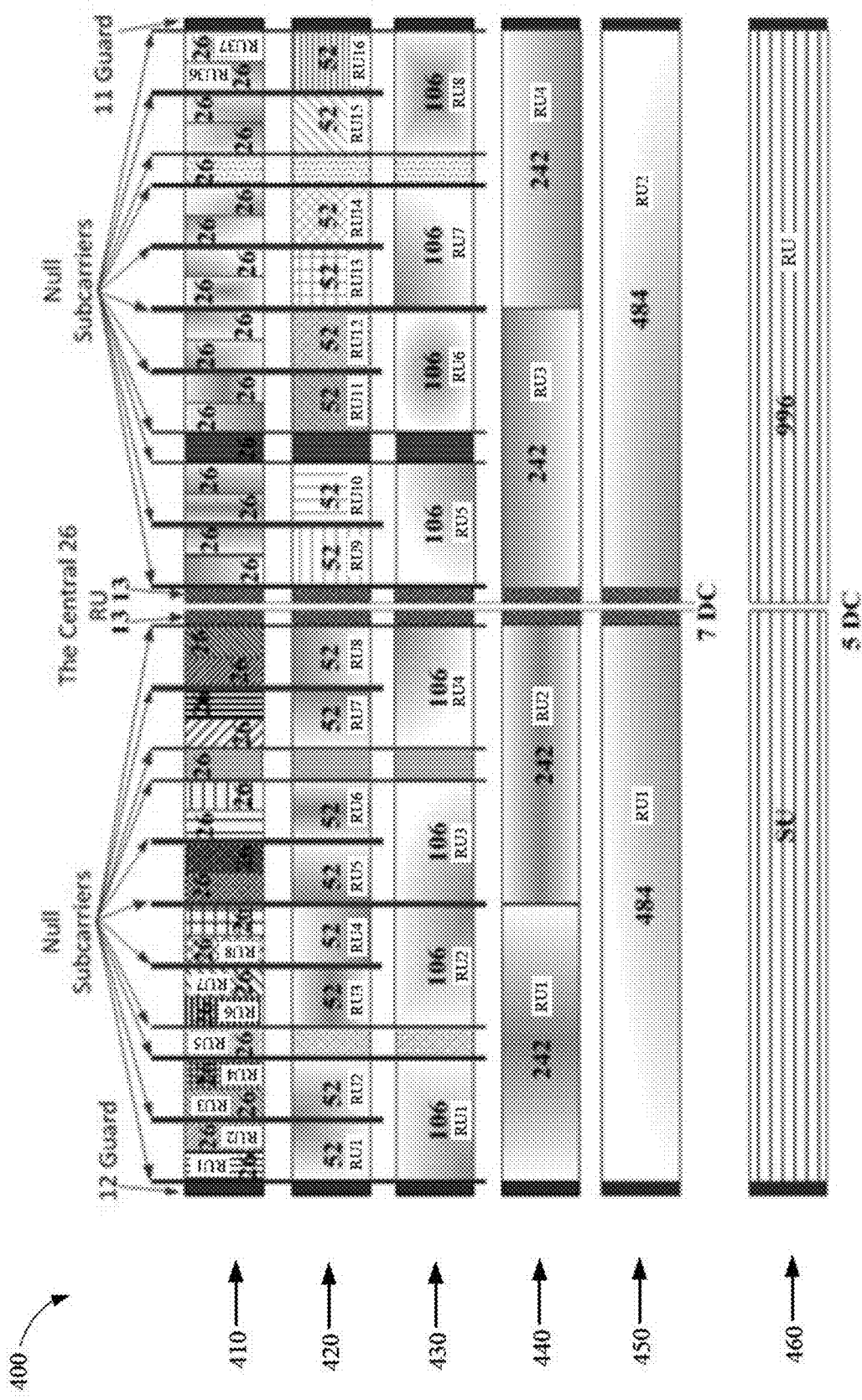
FIG. 4 shows an example subcarrier allocation diagram for narrowband transmissions.

FIG. 4 shows an example subcarrier allocation diagram 400 for an 80 MHz channel that may be used for narrowband transmissions. As used herein, the term "narrowband transmissions" may refer to transmissions using frequency bandwidths of less than 20 MHz. The wireless channel depicted in FIG. 4 may be divided into a number of resource units (RUs), and each of the RUs may include a number of subcarriers. For example, a first subcarrier allocation 410 may include a number of resource units RU1-RU37 each including 26 subcarriers, a second subcarrier allocation 420 may include a number of resource units RU1-RU16 each including 52 subcarriers, a third subcarrier allocation 430 may include a number of resource units RU1-RU8 each including 106 subcarriers, a fourth subcarrier allocation 440 may include a number of resource units RU1-RU4 each including 242 subcarriers, a fifth subcarrier allocation 450 may include a number of resource units RU1-RU2 each including 484 subcarriers, and a sixth subcarrier allocation 460 may include one RU including 996 subcarriers (with the left half of the channel for single-user (SU) operations). For each of the example subcarrier allocations 410, 420, 430, 440, 450, and 460 depicted in FIG. 4, adjacent RUs may be separated by a null subcarrier (such as a DC subcarrier), for example, to reduce leakage between adjacent RUs. It is noted that the numbers 26, 52, 106, 242, 484, and 996 in the example subcarrier allocation diagram 400 represent the number of frequency subcarriers in each of the resource units for a corresponding subcarrier allocation.

An AP may allocate specific or dedicated RUs to a number of wireless devices using a trigger frame. In some implementations, the trigger frame may identify a number of STAs associated with the AP, and may solicit uplink (UL) multi-user (MU) data transmissions from the identified STAs using their allocated RUs. The trigger frame may use association identification (AID) values, assigned by the AP to its associated STAs, to identify which STAs are to transmit UL data to the AP in response to the trigger frame. In some aspects, the trigger frame may indicate the RU size and location, the modulation and coding scheme (MCS), and the power level for UL transmissions to be used by each of the STAs identified in the trigger frame. As used herein, the RU size may indicate the bandwidth of the RU, and the RU location may indicate which frequency subcarriers are allocated to the RU.

Figure 5:
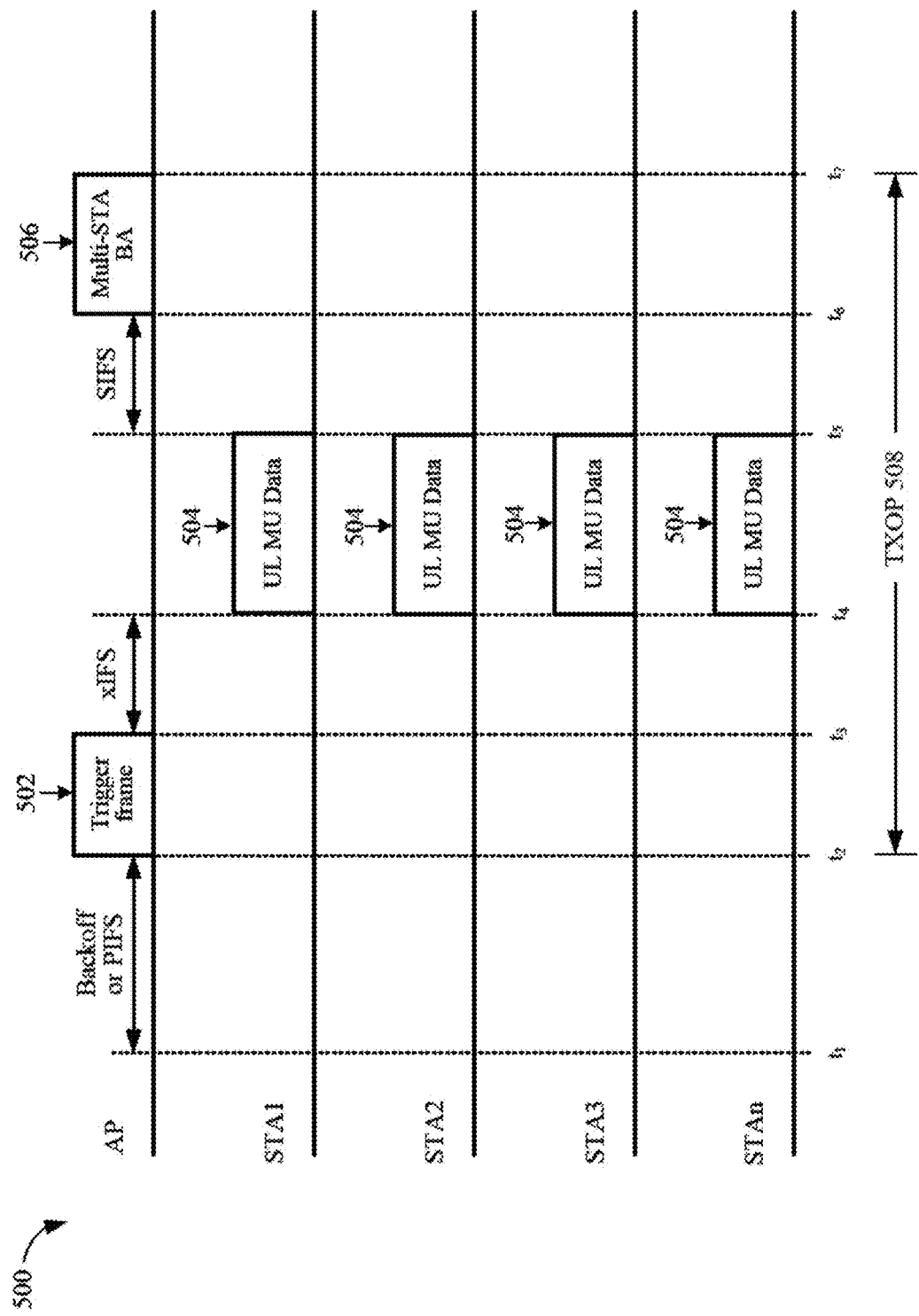
FIG. 5 shows a sequence diagram depicting an example allocation of resource units for uplink transmissions.

FIG. 5 shows a sequence diagram 500 depicting an example allocation of resource units (RUs) for uplink (UL) transmissions. The AP of FIG. 5 may be any suitable AP including, for example, the AP 110 of FIG. 1 or the AP 300 of FIG. 3. Each of the wireless stations STA1-STAn may be any suitable wireless station including, for example, the stations STA1-STA4 of FIG. 1 or the STA 200 of FIG. 2. In some implementations, the AP may contend for medium access during a backoff period or a point coordination function (PCF) interframe space (PIFS) duration (such as between times $t_1$ and $t_2$). In other implementations, the AP may contend for medium access using another suitable channel access mechanism. In some other implementations, the AP may utilize a multiple channel access mechanism, for example, and may not contend for medium access.

The AP gains access to the wireless medium at time $t_2$, and may transmit a trigger frame 502 to the stations STA1-STAn on a downlink (DL) channel Time $t_2$ may indicate a beginning of a transmit opportunity (TXOP) 508. The trigger frame 502 may allocate a dedicated RU to each of a number of the stations STA1-STAn identified by the trigger frame 502, and may solicit UL MU data transmissions from the identified stations STA1-STAn. In some aspects, the dedicated RUs allocated by the trigger frame 502 may be unique, for example, so that the stations STA1-STAn may transmit UL data to the AP at the same time (or at substantially the same time).

The stations STA1-STAn may receive the trigger frame 502 at (or around) time $t_3$. Each of the identified stations STA1-STAn may decode the trigger frame 502 to determine the size and location of the dedicated RU allocated by the trigger frame 502. In some aspects, the trigger frame 502 may schedule UL data transmissions from the identified stations STA1-STAn to commence at an unspecified interframe spacing (xIFS) duration after reception of the trigger frame 502, for example, as depicted in the example of FIG. 5.

At time $t_4$, the identified stations STA1-STAn may begin transmitting UL MU data 504 on their respective dedicated RUs. In some aspects, each of the identified stations STA1-STAn may determine whether the frequency band associated with its allocated RU has been idle for a duration (such as a PIFS duration) prior to transmitting UL MU data to the AP.

The AP may receive the UL MU data 504 from the identified stations STA1-STAn at time $t_5$, and may acknowledge reception of the UL MU data 504 by transmitting a multi-station block acknowledgement (M-BA) frame 506 to the stations STA1-STAn at time $t_6$. In some aspects, the AP may transmit the M-BA frame 506 a short interframe spacing (SIFS) duration after receiving the UL MU data 504 from the stations STA1-STAn. In other implementations, the AP may transmit the M-BA frame 506 after another suitable duration.

Wireless devices that transmit data using a relatively narrow bandwidth may have a shorter range than wireless devices that transmit data using a relatively wide bandwidth. In some aspects, narrowband communications may refer to frequency ranges in which the frequency response of the channel is relatively flat (such that the gain is relatively constant for all frequencies), and wideband communications may refer to frequency ranges that are greater than narrowband communications (such that the frequency response is not flat). A wideband wireless medium is typically divided into a primary channel and one or more secondary channels. The primary and secondary channels may be of various bandwidths, and may be formed by bonding a number of 20 MHz channels together to form 40 MHz channels, 80 MHz channels, or 160 MHz channels. In some aspects, an 80 MHz frequency spectrum may be divided into a primary 20 MHz channel, a secondary 20 MHz channel, and a secondary 40 MHz channel. In other aspects, an 80 MHz frequency spectrum may be divided into a primary 40 MHz channel and a secondary 40 MHz channel.

An AP operating in an OFDMA-based wireless network utilizing an 80 MHz frequency spectrum may allocate RUs smaller than 20 MHz to wireless devices for UL transmissions. In some aspects, the AP may allocate relatively small RUs having sizes such as 2 MHz, 4 MHz, 8 MHz, and 16 MHz to wireless devices for UL transmissions. Because power spectral density limits imposed by governmental regulations are typically expressed as a function of power versus frequency bandwidth, transmission power limits for a given RU are typically proportional to the size of the RU. More specifically, governmental regulations typically allow a wireless device to use higher power levels to transmit wireless signals on a relatively large RU (such as 20 MHz wide) than to transmit wireless signals on a relatively small RU (such as 2 MHz wide).

In some implementations, if a wireless device is allocated an RU having a number ($N_{RU}$) of subcarriers in a wireless network utilizing an 80 MHz channel having a total number ($N_{tot}$) of available subcarriers, then the power spectral density (PSD) gain ($G_{PSD}$) of the wireless device when transmitting data using a smaller RU (as compared with the allocated RU) may be expressed as $G_{PSD}=10 \log 10(N_{tot}/N_{RU})$. For example, the PSD gain of the wireless device for transmissions using a 2 MHz RU may be expressed as $G_{PSD}=10 \log 10(37)=15.6$ dB. Because a PSD gain of 15.6 dB exceeds the 11 dBm/MHz PSD limit imposed on Wi-Fi devices by the ETSI, the wireless device would need to reduce its transmission power level to comply with the ETSI's PSD limits on Wi-Fi devices, which in turn may undesirably decrease the range of the wireless device.

In accordance with aspects of the present disclosure, a wireless device may employ frequency hopping techniques for OFDMA transmissions to qualify as a frequency hopping device. Because frequency hopping devices are allowed higher transmit power levels than Wi-Fi devices for a given transmission bandwidth, the ability to qualify as a frequency hopping device may allow Wi-Fi devices to transmit OFDMA communications at higher power levels than would be possible without using frequency hopping techniques. In some implementations, an AP may select a unique frequency hopping pattern for each of a number of selected wireless devices, for example, so that each of the selected wireless devices can qualify as a frequency hopping device. The AP may combine the various unique frequency hopping patterns into a frequency hopping schedule, and allocate RUs to the selected wireless devices according to the frequency hopping schedule. In some aspects, the AP may select a pre-defined frequency hopping pattern for each of the selected wireless devices. In other aspects, the AP may select a proprietary frequency hopping pattern for each of the selected wireless devices.

The AP may announce the frequency hopping schedule and the allocated RUs to the selected wireless devices in any suitable manner In some aspects, the AP may announce the frequency hopping schedule and the allocated RUs to the selected wireless devices in one or more trigger frames. In other aspects, the AP may announce the frequency hopping schedule to the selected wireless devices in a beacon frame, and may allocate RUs based on the frequency hopping schedule to the selected wireless devices in one or more trigger frames. In still other aspects, the AP may announce the frequency hopping schedule to the selected wireless devices using any suitable broadcast or multicast frame or packet.

By qualifying each of the wireless devices as a frequency hopping device (rather than as a Wi-Fi device), aspects of the present disclosure may allow the wireless devices to transmit wireless signals at power levels greater than the PSD limits imposed on OFDMA transmissions, which can increase the range of the wireless devices. For example, by qualifying a wireless device operating in Europe as a frequency hopping device, the wireless device may transmit OFDMA communications on a 2 MHz RU using power levels up to 20 dBm (such as compared to the ETSI's limit of 14 dBm on OFDMA transmissions on a 2 MHz channel).

The AP may select or dynamically adjust the frequency hopping patterns based on its geographic location, for example, so that the AP and the selected wireless devices can comply with applicable power spectral density limits for frequency hopping devices. For one example, Japan considers a wireless device to be a frequency hopping device in the 2.4 GHz band if the wireless device hops over 15 or more channels and has a dwell time in each of the channels that is less than 400 milliseconds (ms). For another example, Europe considers a wireless device to be a frequency hopping device in the 2.4 GHz band if the wireless device hops over 15 or more channels and the accumulated dwell time in each channel is less than 15 ms over the frequency hopping duration.

In some implementations, the AP may select unique frequency hopping patterns that do not assign the same frequency subcarriers to the same wireless device for at least 15 successive transmissions. More specifically, the AP may determine a frequency hopping schedule and allocate unique sequences of RUs to its wireless devices so that each of the wireless devices hops over at least 15 different RUs (or channels), for example, to qualify the wireless devices as frequency hopping devices in Europe and Japan. In some aspects, the AP may select frequency hopping patterns to ensure that each wireless device spends less than 400 ms transmitting data on a given RU, for example, to qualify as a frequency hopping device in Japan. In other aspects, the AP may select frequency hopping patterns to ensure that the accumulated dwell time for the wireless devices in each of the allocated RUs is less than 15 ms over the frequency hopping sequence, for example, to qualify as frequency hopping devices in Europe.

Figure 6A:
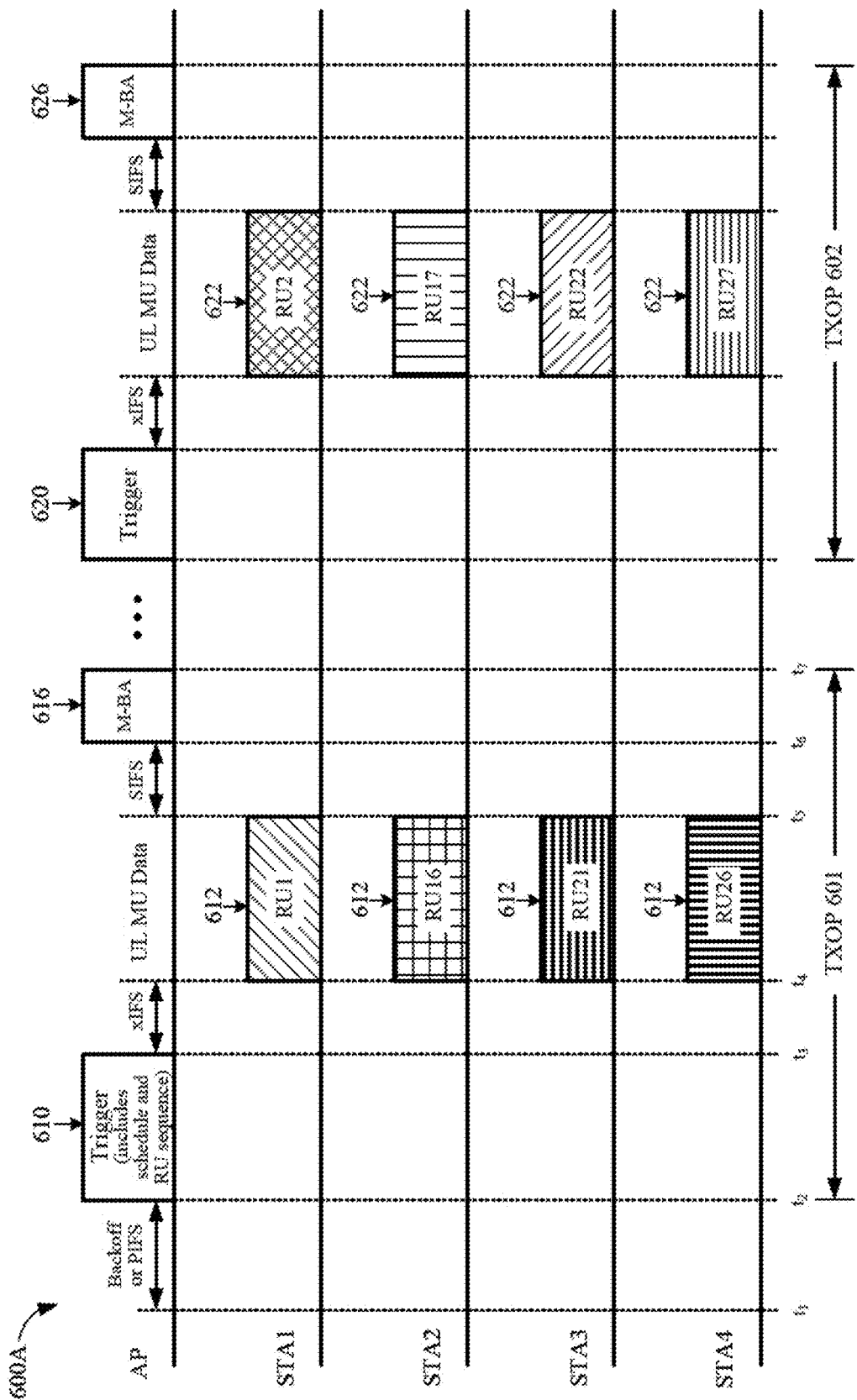
FIG. 6A shows a sequence diagram depicting an example allocation of resource units based on frequency hopping.

FIG. 6A shows a sequence diagram 600A depicting an example allocation of resource units (RUs) based on frequency hopping. For purposes of discussion herein, FIG. 6A depicts an access point (AP) allocating RUs to a number of associated wireless stations STA1-STA4. The AP may be any suitable AP including, for example, the AP 110 of FIG. 1 or the AP 300 of FIG. 3. Each of the stations STA1-STA4 may be any suitable wireless station including, for example, the stations STA1-STA4 of FIG. 1 or the STA 200 of FIG. 2.

The AP may select a unique frequency hopping pattern for each of its associated stations STA1-STA4, and may determine a frequency hopping schedule for UL transmissions based on the selected frequency hopping patterns. In some aspects, the frequency hopping patterns selected by the AP may be based on the geographic location of the AP. In other aspects, the frequency hopping patterns selected by the AP also may depend upon the available frequency spectrum, the number of available RUs, and the number of subcarriers for each of the RUs.

In some implementations, the AP may contend for medium access during a backoff period or a PIFS duration (such as between times $t_1$ and $t_2$). In other implementations, the AP may contend for medium access using another suitable channel access mechanism. In some other implementations, the AP may utilize a multiple channel access mechanism, for example, and may not contend for medium access.

The AP gains access to the wireless medium at time $t_2$, which may be the beginning of a first TXOP 601. The AP may transmit a trigger frame 610 to the stations STA1-STA4 on a DL channel In some implementations, the trigger frame 610 may announce the frequency hopping schedule to the stations STA1-STA4, and may allocate a unique sequence of RUs to each of the stations STA1-STA4 based on the frequency hopping patterns selected by the AP. In some aspects, the trigger frame 610 may indicate the RU sizes and locations, the MCSs, and the power levels to be used by each of the stations STA1-STA4 for UL transmissions using the allocated RUs.

As depicted in FIG. 6A, the trigger frame 610 allocates unique sequences of RUs for which each of the stations STA1-STA4 is to use for frequency hopping during a sequence period. The sequence period may include or be defined by the number of different RUs between which a wireless device must hop to qualify as a frequency hopping device. For example, if the AP is located where governmental regulations define a frequency hopping device as a device that hops over 15 different channels, then the sequence period may correspond to the period of time during which the stations STA1-STA4 hop between 15 different RUs.

In some implementations, the trigger frame 610 may indicate that the allocation of RUs is based on a frequency hopping schedule, and may indicate that the AP is instructing its associated devices to employ frequency hopping techniques for UL OFDMA transmissions. In some aspects, the RUs allocated to the stations STA1-STA4 of FIG. 6A may be of different sizes. For example, stations that have a relatively small amount of UL data may be allocated relatively small RUs (such as 2 MHz), and stations that have a relatively large amount of UL data may be allocated relatively large RUs (such as 4 MHz, 8 MHz, or 16 MHz).

The stations STA1-STA4 may receive the trigger frame 610 at (or around) time $t_3$. Upon receiving the trigger frame 610, each of the stations STA1-STA4 may extract the frequency hopping schedule and may determine its unique sequence of RUs allocated by the AP. In some aspects, the frequency hopping schedule may instruct each of the stations STA1-STA4 to dwell less than a duration on each of the allocated RUs (such as for less than 400 ms per RU when the AP is located in Japan). In other aspects, the frequency hopping schedule may instruct each of the stations STA1-STA4 that the accumulated dwell time is to be less than 15 ms over the sequence period (such as when the AP is operating in Europe).

At time $t_4$, each of the stations STA1-STA4 may begin transmitting UL MU data 612 on its unique RU. For the example of FIG. 6A, the first station STA1 transmits UL MU data 612 on resource unit RU1, the second station STA2 transmits UL MU data 612 on resource unit RU16, the third station STA3 transmits UL MU data 612 on resource unit RU21, and the fourth station STA4 transmits UL MU data 612 on resource unit RU26. In this manner, each of the stations STA1-STA4 may transmit UL MU data to the AP at the same time (or substantially the same time) using different RUs.

The trigger frame 610 may solicit UL data transmissions from the stations STA1-STA4 to commence at an unspecified interframe spacing (xIFS) duration after reception of the trigger frame 610. In some aspects, the trigger frame 610 may include a channel sense (CS) bit indicating whether the stations STA1-STA4 should sense the channel prior to transmitting UL MU data. For one example, if the CS bit is asserted, then each of the stations STA1-STA4 may determine whether the frequency band of its allocated RU has been idle for a duration (such as a PIFS duration) prior to transmitting UL MU data to the AP. For another example, if the CS bit is not asserted, then the stations STA1-STA4 may commence UL transmissions upon expiration of the xIFS duration.

The AP may receive the UL MU data 612 from the stations STA1-STA4 at time $t_5$, and may acknowledge reception of the UL MU data 612 by transmitting a multi-station block acknowledgement (M-BA) frame 616 to the stations STA1-STA4 at time $t_6$. In some aspects, the AP may transmit the M-BA frame 616 a short interframe spacing (SIFS) duration after receiving the UL MU data from the stations STA1-STA4. In other implementations, the AP may transmit the M-BA frame 616 after another suitable duration. The stations STA1-STA4 receive the M-BA frame 616 at time $t_7$, which may signal the end of the first TXOP 601.

After a duration, the AP may transmit a second trigger frame 620 to the stations STA1-STA4. The second trigger frame 620, which may signal a beginning of a second TXOP 602, may solicit UL transmissions from the stations STA1-STA4 on their allocated RUs. For the example of FIG. 6A, the first station STA1 transmits UL MU data 622 on resource unit RU2, the second station STA2 transmits UL MU data 622 on resource unit RU17, the third station STA3 transmits UL MU data 622 on resource unit RU22, and the fourth station STA4 transmits UL MU data 622 on resource unit RU27. Because the first trigger frame 610 has already informed the stations STA1-STA4 of the frequency hopping schedule and has already allocated unique sequences of RUs to each of the stations STA1-STA4 for the sequence period, the second trigger frame 620 may not contain the frequency hopping schedule and may not allocate RUs to the stations STA1-STA4 (such as to minimize the size and transmit duration of the second trigger frame 620).

The AP may acknowledge reception of the UL MU data 622 by transmitting a second M-BA frame 626 to the stations STA1-STA4. Reception of the second M-BA frame 626 by the stations STA1-STA4 may signal the end of the second TXOP 602. The stations STA1-STA4 may continue transmitting UL MU data to the AP in this manner, for example, such that (1) during any given TXOP each of the stations STA1-STA4 is allocated a different RU and (2) each of the stations STA1-STA4 does not transmit UL data on the same RU in any given sequence period (such as 15 TXOPs).

Figure 6B:
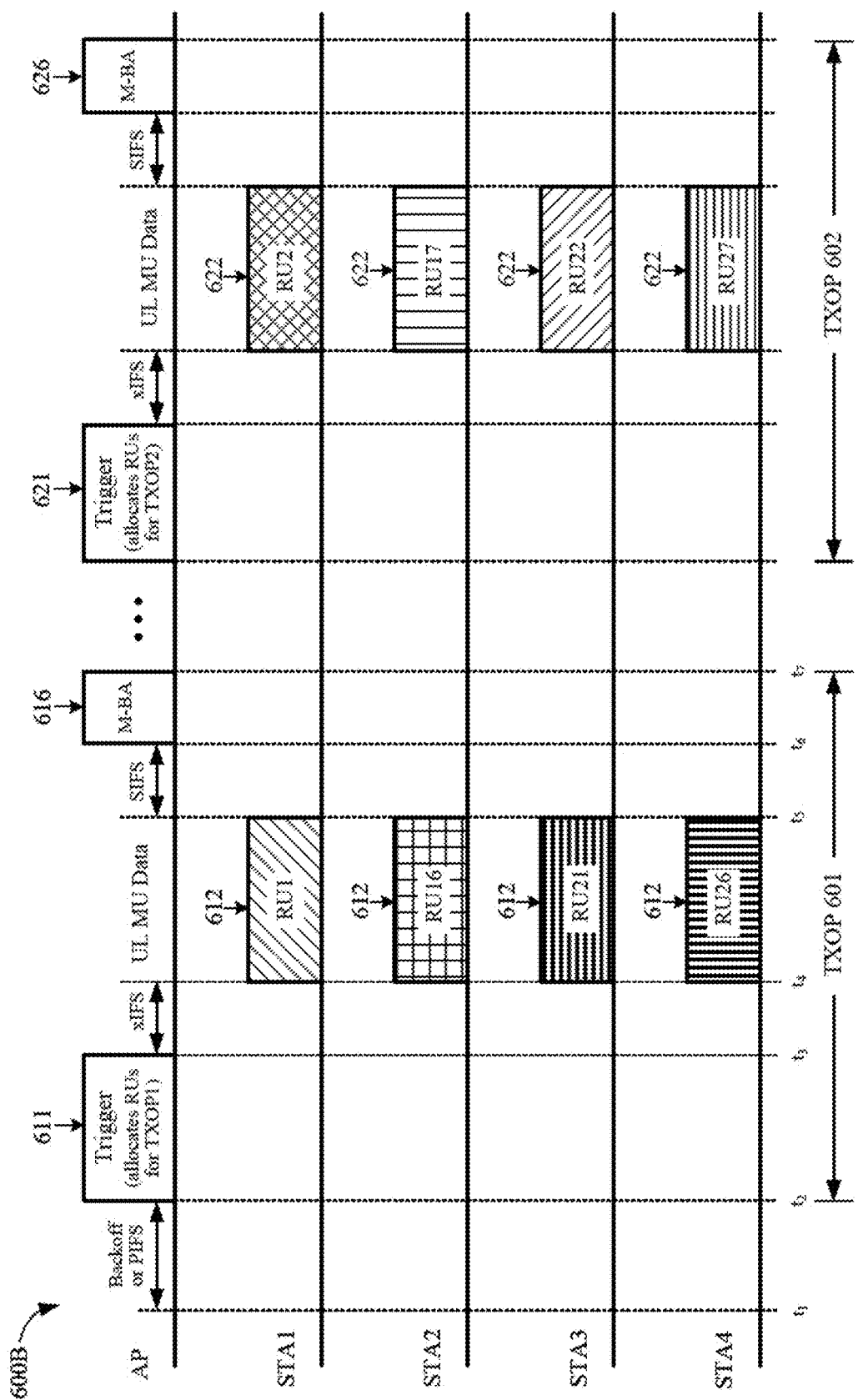
FIG. 6B shows a sequence diagram depicting another example allocation of resource units based on frequency hopping.

FIG. 6B shows a sequence diagram 600B depicting another example allocation of resource units (RUs) based on frequency hopping. The sequence diagram 600B of FIG. 6B is similar to the sequence diagram 600A of FIG. 6A, except that instead of transmitting a trigger frame that announces the frequency hopping schedule and that allocates unique sequences of RUs for the entire sequence period, the AP transmits a trigger frame 611, at time $t_2$, that allocates RUs to the stations STA1-STA4 for the corresponding TXOP 601. Each of the stations STA1-STA4 receives the trigger frame 611, identifies its allocated RU, and then transmits UL MU data to the AP using its allocated RU. After the first TXOP 601 ends, the AP transmits a second trigger frame 621 that allocates RUs to the stations STA1-STA4 for the second TXOP 602. Each of the stations STA1-STA4 receives the second trigger frame 621, identifies its allocated RU, and then transmits UL MU data to the AP using its allocated RU. The stations STA1-STA4 may continue transmitting UL MU data to the AP in this manner, for example, such that (1) at the beginning of each TXOP the AP transmits a trigger frame to allocate unique RUs to the stations STA1-STA4, and (2)

each of the stations STA1-STA4 does not transmit UL data on the same RU in any given sequence period (such as 15 TXOPs).

Figure 7A:
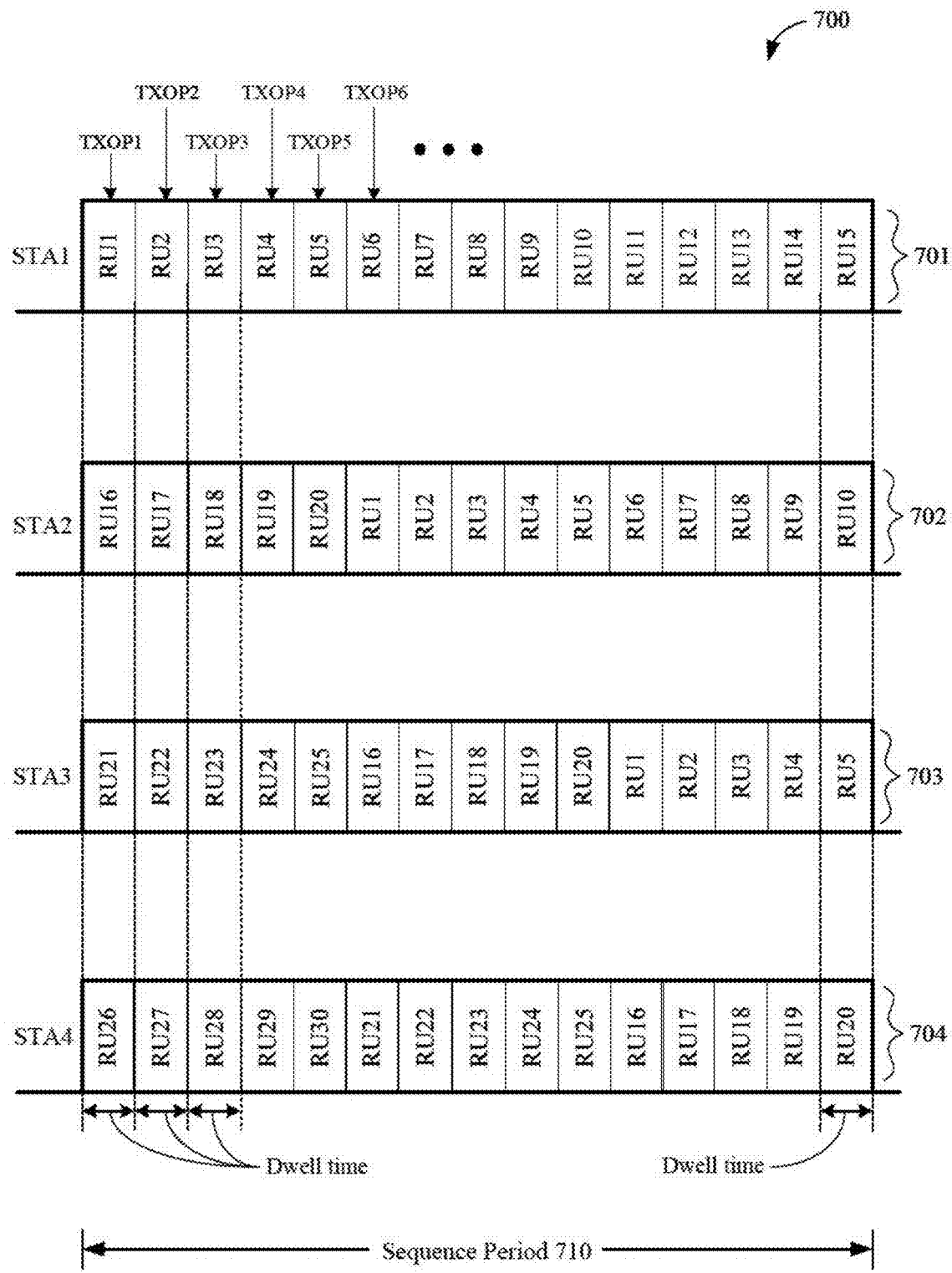
FIG. 7A shows an illustration depicting example sequences of resource units that may be used for frequency hopping during OFDMA transmissions.

FIG. 7A shows an illustration 700 depicting example sequences of RUs that may be used for frequency hopping during OFDMA transmissions. For purposes of discussed herein, the unique RU sequences 701-704 depicted in the illustration 700 may be used by respective stations STA1-STA4 of FIGS. 6A and 6B for transmitting UL data. It is to be understood that the unique RU sequences 701-704 may be used by other wireless devices to qualify as frequency hopping devices during OFDMA transmissions, and that the stations STA1-STA4 of FIGS. 6A and 6B may use other suitable sequences of RUs to qualify as frequency hopping devices during OFDMA transmissions.

Each of the unique RU sequences 701-704 is shown to include 15 different RUs that may be used by a respective one of the stations STA1-STA4 to transmit UL data using OFDMA communications during a sequence period 710. Although the unique RU sequences 701-704 may include some of the same RUs, each of the unique RU sequences 701-704 includes only one instance of any given RU, and the same RU is not allocated to more than one of the unique RU sequences 701-704 at the same time.

In some implementations, the RUs within the unique RU sequences 701-704 may each be allocated to a corresponding station for a duration equal to (or substantially equal to) the channel dwell time specified for frequency hopping devices. For example, when the AP is located in Japan, each of the RUs within a given one of the unique RU sequences 701-704 may be allocated to a corresponding station for no more than 400 ms. In other implementations, the accumulated dwell time in each RU is less than an amount over the duration of the sequence period 710. For example, when the AP is located in Europe, the accumulated dwell time in each RU is less than 15 ms over the duration of the sequence period 710.

In addition, or in the alternative, each of the RUs within a given one of the unique RU sequences 701-704 may correspond to a TXOP. For the example of FIG. 7A, the first station STA1 may transmit UL data using RU1 during a first TXOP, may transmit UL data using RU2 during a second TXOP, may transmit UL data using RU3 during a third TXOP, and so on, and then transmit UL data using RU15 during a fifteenth TXOP. The second station STA2 may transmit UL data using RU16 during the first TXOP, may transmit UL data using RU17 during the second TXOP, may transmit UL data using RU18 during the third TXOP, and so on, and then transmit UL data using RU10 during the fifteenth TXOP. The third station STA3 may transmit UL data using RU21 during the first TXOP, may transmit UL data using RU22 during the second TXOP, may transmit UL data using RU23 during the third TXOP, and so on, and then transmit UL data using RU5 during the fifteenth TXOP. The fourth station STA4 may transmit UL data using RU26 during the first TXOP, may transmit UL data using RU27 during the second TXOP, may transmit UL data using RU28 during the third TXOP, and so on, and then transmit UL data using RU20 during the fifteenth TXOP.

By using the unique RU sequences 701-704 to frequency hop during OFDMA transmissions, each of the stations STA1-STA4 may qualify as a frequency hopping device, and thus use transmission power levels imposed on frequency hopping devices. Because many governmental regulations allow higher transmission power levels for frequency hopping devices than for wireless devices using OFDMA communications, the ability to qualify as frequency hopping devices may allow the stations STA1-STA4 to increase their transmission power levels without violating PSD limits. For example, if the stations STA1-STA4 are operating in a wireless network located in Europe, the ability to qualify as frequency hopping devices may allow the stations STA1-STA4 to increase their transmission power levels from approximately 14 dBm (such as imposed on wireless devices using OFDMA transmissions) to approximately 20 dBm (such as imposed on frequency hopping devices). In this manner, aspects of the present disclosure may increase the wireless range of the stations STA1-STA4 without violating power spectral density limits.

FIG. 7B shows an illustrative table 720 depicting an example construction of the unique RU sequence 701 of FIG. 7A. The example construction of the unique RU sequence 701 is described below in the context of an 80 MHz Wi-Fi network. It is to be understood that the example construction of the unique RU sequence 701, or derivations thereof, also may be applicable to wireless networks utilizing other frequency bandwidths (such as a 40 MHz bandwidth).

Referring also to FIG. 4, the IEEE 802.11ax specification may specify that an 80 MHz channel includes thirty-seven (37) 2 MHz RUs. In some implementations, an AP may assign each of the thirty-seven RUs (denoted as RU1-RU37 in FIG. 7B) an initial count value of "0." An RU having a count value of "0" may be available for allocation to one of the AP's associated devices for UL OFDMA transmissions during a next TXOP.

When the AP initially allocates an RU to a wireless device for UL OFDMA transmissions, the AP may reset the count value of the RU to a maximum count value of "15." For each subsequent TXOP, the AP may select one of the RUs that has a count value of "0," and may decrement the count values of all RUs previously allocated to the wireless device by a value of "1." This process of allocating unique RUs to the wireless device may continue until the wireless device has transmitted UL MU data on at least 15 different RUs (which may correspond to a sequence period for the wireless device). A similar process may be performed for each of the wireless devices identified for UL transmissions by the trigger frame. In this manner, the AP may ensure that none of its wireless devices transmits UL data on the same RU for at least 15 TXOPs.

In some aspects, the maximum count value may be based on the number of successive channel hops for which a wireless device can qualify as a frequency hopping device. Thus, in locations such as Japan and Europe, when an RU is initially allocated to a wireless device for UL OFDMA transmissions, the AP may reset its count value to a maximum count value of "15," for example, because both Japan and Europe consider a wireless device to be a frequency hopping device based at least in part on the wireless device hopping between 15 different channels (or RUs) within a given sequence period. For other locations, the maximum count value may be set to another suitable number depending, for example, on applicable governmental regulations for qualifying a wireless device as a frequency hopping device.

For the example of FIG. 7B, the AP allocates RU1 to STA1 during the first TXOP, and resets the count value of RU1 to 15. For the second TXOP, the AP allocates RU2 to STA1, resets the count value of RU2 to 15, and decrements the count value of RU1 to 14. For the third TXOP, the AP allocates RU3 to STA1, resets the count value of RU3 to 15, decrements the count value of RU2 to 14, and decrements the count value of RU1 to 13. For the fourth TXOP, the AP allocates RU4 to STA1, resets the count value of RU4 to 15, decrements the count value of RU3 to 14, decrements the count value of RU2 to 13, and decrements the count value of RU1 to 12. This process may continue until the AP has allocated 15 different RUs to STA1, for example, during a sequence period that spans 15 RUs. Thus, for the fifteenth TXOP, the AP may allocate RU15 to STA1, reset its count value to 15, and decrement each of the count values of the previously allocated resource units RU1-RU14 by 1, for example, as depicted in the table 720 of FIG. 7B.

The AP may construct unique RU sequences for other wireless devices in a similar manner, for example, by staggering the allocation of RUs in a manner that prevents the same RU from being used by more than one wireless device in a given TXOP. For example, the AP may use the example table 720 to construct unique RU sequences 702-704 for respective stations STA2-STA4 of FIG. 7A.

In other implementations, the AP may use negative numbers (rather than positive numbers) to determine when previously used RUs may again be available for allocation to wireless devices. For example, when the AP allocates an RU to a wireless device during a TXOP, the AP may reset the count value of the RU to a minimum weight value of "−15" (or other number based on the number of successive channel hops for a wireless device to qualify as a frequency hopping device). Then, the AP may increment the count value for previously allocated RUs by "1" (such as to a more positive number) during each subsequent TXOP. When the count value for a given RU has been incremented to its initial count value of "0," the given RU may once again be allocated by the AP to one of its wireless devices for UL OFDMA transmissions.

Figure 8:
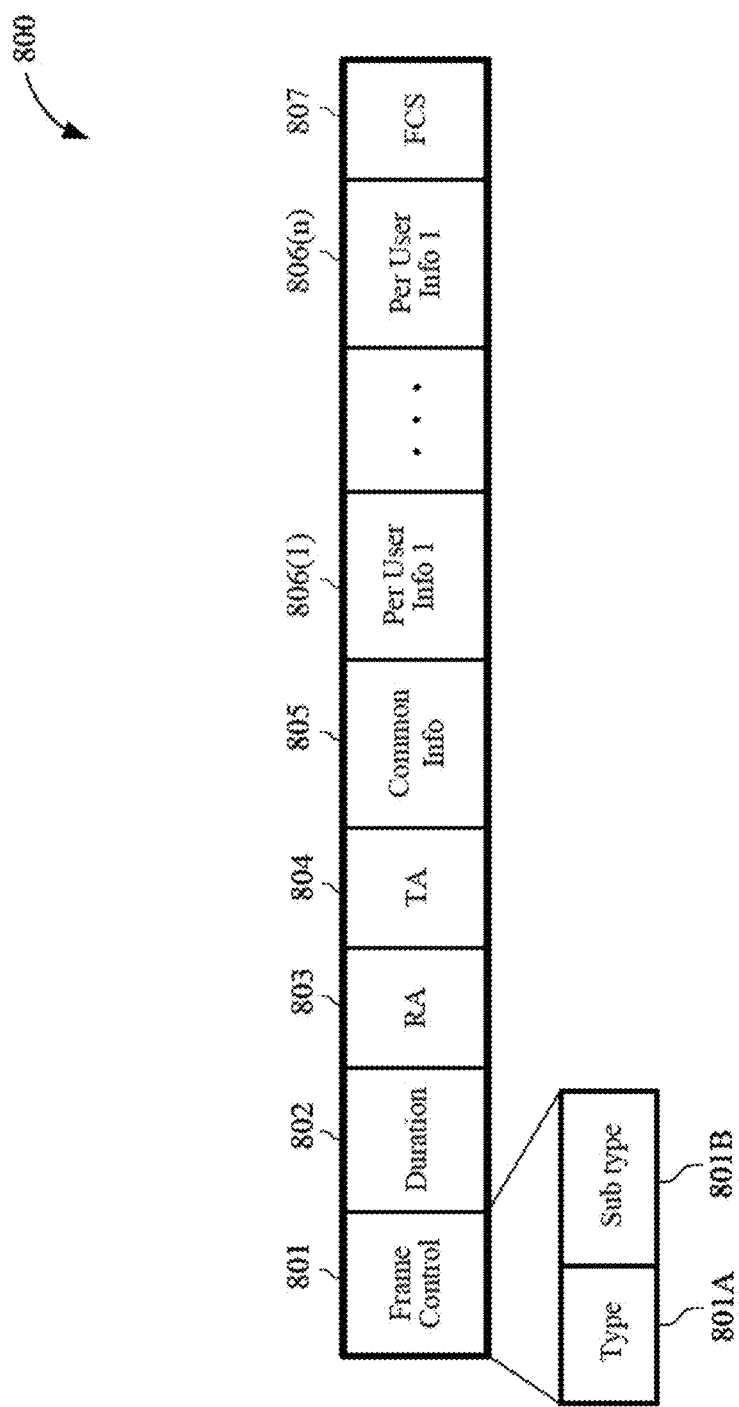
FIG. 8 shows an example trigger frame.

FIG. 8 shows an example trigger frame 800. The trigger frame 800 may be used as the trigger frame 610 of FIG. 6A or as the trigger frame 620 of FIG. 6B. The trigger frame 800 is shown to include a frame control field 801, a duration field 802, a receiver address (RA) field 803, a transmitter address (TA) field 804, a Common Info field 805, a number of Per User Info fields 806(1)-806(n), and a frame check sequence (FCS) field 807.

The frame control field 801 includes a Type field 801A and a Sub-type field 801B. The Type field 801A may store a value to indicate that the trigger frame 800 is a control frame, and the Sub-type field 801B may store a value indicating a type of the trigger frame 800. The duration field 802 may store information indicating a duration or length of the trigger frame 800. The RA field 803 may store the address of a receiving device (such as one of the wireless stations STA1-STA4 of FIGS. 6A and 6B). The TA field 804 may store the address of a transmitting device (such as the AP of FIGS. 6A and 6B). The Common Info field 805 may store information common to one or more receiving devices. Each of the Per User Info fields 806(1)-806(n) may store information for a particular receiving device, as described in more detail below with respect to FIG. 9B. The FCS field 807 may store a frame check sequence (such as for error detection). In some implementations, the Common Info field 805 may store a frequency hopping schedule. In other implementations, the frequency hopping schedule may be stored in an information element (IE) or a vendor-specific information element (VSIE) included within or appended to the trigger frame 800 (the IE and VSIE not shown for simplicity). In some other implementations, the frequency hopping schedule may be stored in a packet extension appended to the trigger frame 800 (the packet extension not shown for simplicity).

FIG. 9A shows an example Common Info field 900. The Common Info field 900 may be one implementation of the Common Info field 805 of the trigger frame 800 of FIG. 8. The Common Info field 900 is shown to include a length subfield 901, a cascade indication subfield 902, a high-efficiency signaling A (HE-SIG-A) info subfield 903, a cyclic prefix (CP) and legacy training field (LTF) type subfield 904, a trigger type subfield 905, and a trigger-dependent common info subfield 906. The length subfield 901 may indicate the length of a legacy signaling field of the UL data frames to be transmitted in response to the trigger frame 800. The cascade indication subfield 902 may indicate whether a subsequent trigger frame follows the current trigger frame. For example, the cascade indication subfield 902 of the trigger frame 611 of FIG. 6B may indicate that trigger frame 621 is to follow the trigger frame 611.

The HE-SIG-A Info subfield 903 may indicate the contents of a HE-SIG-A field of the UL data frames to be transmitted in response to the trigger frame 800. The CP and LTF type subfield 904 may indicate the cyclic prefix and HE-LTF type of the UL data frames to be transmitted in response to the trigger frame 600. The trigger type subfield 905 may indicate the type of trigger frame. The trigger-dependent common info subfield 906 may indicate trigger-dependent information. In some aspects, the trigger-dependent common info subfield 906 may store a frequency hopping schedule.

FIG. 9B shows an example Per User Info field 910. The Per User Info field 910 may be one implementation of the Per User Info fields 806(1)-806(n) of the trigger frame 800 of FIG. 8. The Per User Info field 910 is shown to include a User Identifier subfield 911, an RU Allocation subfield 912, a Coding Type subfield 913, an MCS subfield 914, a dual-carrier modulation (DCM) subfield 915, a spatial stream (SS) Allocation subfield 916, and a trigger-dependent Per User info subfield 917. The User Identifier subfield 911 may indicate the association identification (AID) of the STA to which a dedicated RU is allocated for transmitting UL MU data. The RU Allocation subfield 912 may identify the dedicated RU allocated to the corresponding STA (such as the STA identified by the User Identifier subfield 911). The Coding Type subfield 913 may indicate the type of coding to be used by the corresponding STA when transmitting UL data using the allocated RU. The MCS subfield 914 may indicate the MCS to be used by the corresponding STA when transmitting UL data using the allocated RU. The DCM subfield 915 may indicate the dual carrier modulation to be used by the corresponding STA when transmitting UL data using the allocated RU. The SS Allocation subfield 916 may indicate the number of spatial streams to be used by the corresponding STA when transmitting UL data using the allocated RU.

The trigger-dependent Per User info subfield 917 may store information, for the STA identified by User Identifier subfield 911, that depends upon the type of trigger frame. For example, if the trigger frame is a multi-user block acknowledgement request (MU-BAR) frame, then the trigger-dependent Per User info subfield 917 may store BAR control parameters and BAR information. In some aspects, the trigger-dependent Per User info subfield 917 may store a frequency hopping pattern for a corresponding STA.

Figure 10:
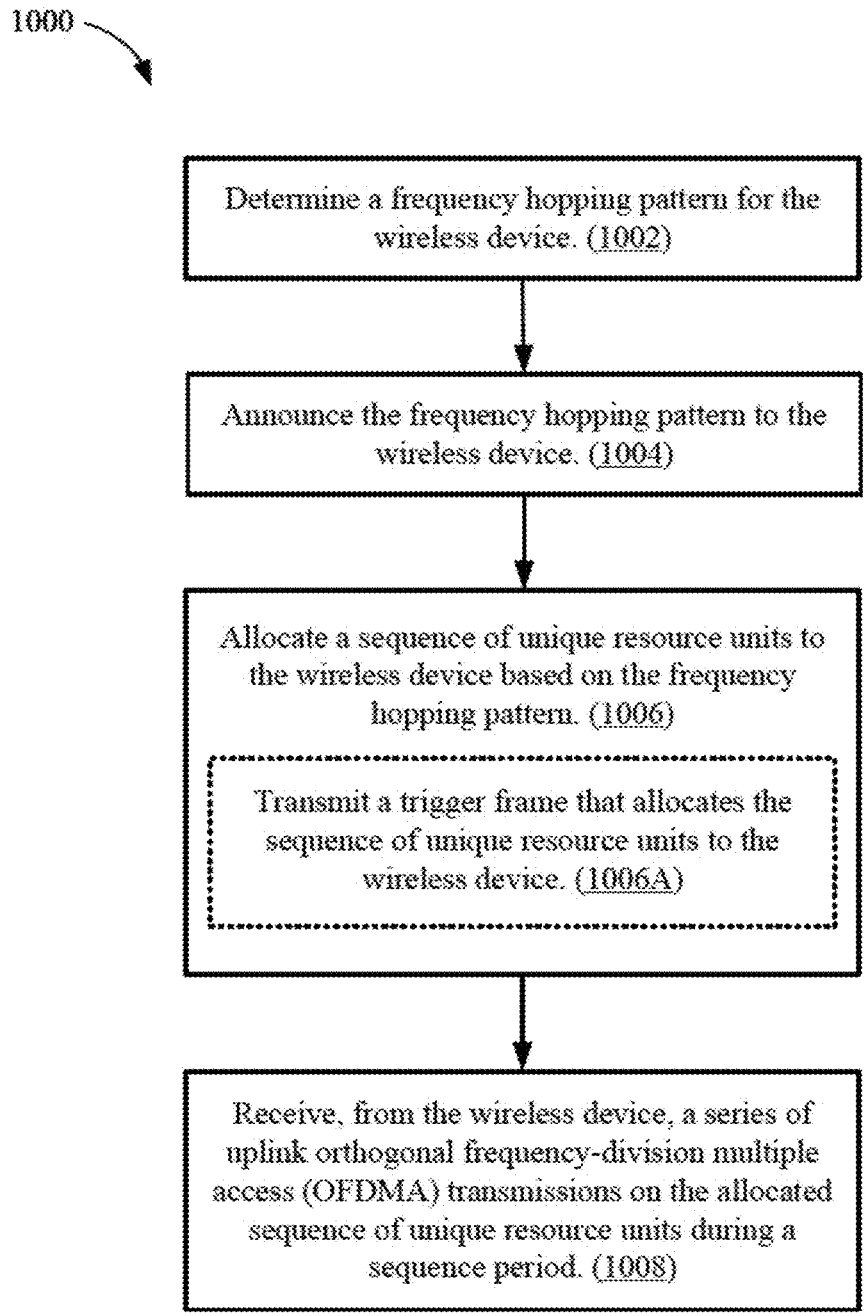
FIG. 10 shows an illustrative flow chart depicting an example operation for qualifying a wireless device as frequency hopping device.

FIG. 10 shows an illustrative flow chart depicting an example operation 1000 for qualifying a wireless device as a frequency hopping device. Although the example operation 1000 is described below in the context of an AP allocating resource units to a wireless device, it is to be understood that any suitable wireless device may perform the operation 1000 of FIG. 10. For some implementations, the wireless device may be an example of one of the stations STA1-STA4 of FIG. 1 or the STA 200 of FIG. 2, and the AP may be an example of the AP 110 of FIG. 1 or the AP 300 of FIG. 3.

The AP may determine a frequency hopping pattern for the wireless device (1002). In some implementations, the frequency hopping pattern may be based on governmental regulations indicating qualifications to be considered as a frequency hopping device. In some aspects, the frequency hopping pattern may indicate that the wireless device is to hop between 15 or more unique frequency bands during a time period. The frequency hopping pattern also may indicate a maximum dwell time on each of the unique frequency bands or may indicate that an accumulated dwell time in the unique frequency bands is to be no more than a time period greater than a duration of the frequency hopping sequence.

The AP may announce the frequency hopping pattern to the wireless device (1004). In some implementations, the AP may announce the frequency hopping pattern in a beacon frame. The beacon frame also may include a frequency hopping schedule for a number of wireless devices associated with the AP. In some aspects, the frequency hopping schedule may include or be formed by the frequency hopping patterns of the number of wireless devices associated with the AP. In other implementations, the AP may announce the frequency hopping pattern in a trigger frame. The trigger frame also may include the frequency hopping schedule for multiple wireless devices associated with the AP.

The AP may allocate a sequence of unique resource units to the wireless device based on the frequency hopping pattern (1006). Each of the unique resource units includes a different set of frequency subcarriers, for example, so that multiple wireless devices can transmit uplink data at the same time. In some aspects, each of the unique resource units may be associated with a corresponding one of a series of transmit opportunities (TXOPs).

In some implementations, the trigger frame may allocate the sequence of unique resource units to the wireless device (1006A). The trigger frame may contain an indication that the wireless device is to successively frequency hop between more than a specified number of the unique resource units. In addition, or in the alternative, the trigger frame may contain one of an indication that the wireless device is to dwell on each of the unique resource units for less than a duration and an indication that an accumulated dwell time in the unique resource units is to be no more than a time period greater than a duration of the sequence of unique resource units. In some aspects, the dwell time is 400 milliseconds, the time period is 15 milliseconds, and the sequence includes at least 15 unique resource units.

In other implementations, each trigger frame may allocate resource units to the wireless device for a corresponding TXOP, for example, as described above with respect to FIG. 6B.

The AP may receive, from the wireless device, a series of uplink orthogonal frequency-division multiple access (OFDMA) transmissions on the allocated sequence of unique resource units during a sequence period (1008). Because the wireless device switches or "hops" between different resource units while sending a series of OFDMA transmissions to the AP in a manner consistent with frequency hopping devices, the wireless device may qualify as a frequency hopping device and transmit signals at higher power levels associated with frequency hopping devices. In this manner, aspects of the present disclosure may increase the range of the wireless device.

Figure 11:
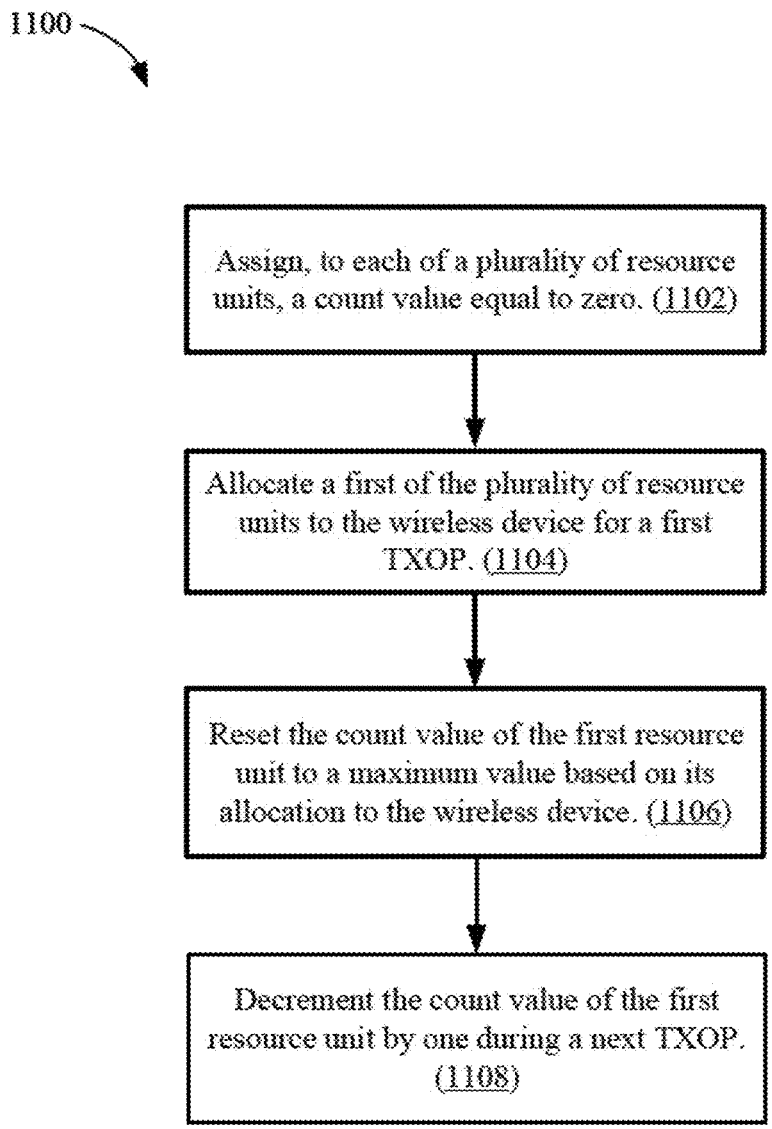
FIG. 11 shows an illustrative flow chart depicting an example operation for allocating resource units to a wireless device.

FIG. 11 shows an illustrative flow chart depicting an example operation 1100 for allocating resource units to a wireless device. Although the example operation 1100 is described below in the context of an AP allocating resource units to a wireless device, it is to be understood that any suitable wireless device may perform the operation 1100 of FIG. 11. For some implementations, the wireless device may be an example of the stations STA1-STA4 of FIG. 1 or the STA 200 of FIG. 2, and the AP may be an example of the AP 110 of FIG. 1 or the AP 300 of FIG. 3.

The AP may assign, to each of a plurality of resource units, a count value equal to zero (1102). For example, referring also to FIG. 7B, the AP may assign each of the resource units RU1-RU37 an initial count value of "0." A resource unit (RU) having a count value of "0" may be available for allocation to one of the AP's associated devices for UL OFDMA transmissions during a next TXOP.

The AP may allocate a first of the plurality of resource units to the wireless device for a first transmit opportunity (TXOP) (1104), and then reset the count value of the first resource unit to a maximum value based on its allocation to the wireless device (1106). In some implementations, the maximum count value may be "15," for example, because both Japan and Europe consider a wireless device to be a frequency hopping device based at least in part on the wireless device hopping between 15 different channels (or RUs) within a given sequence period.

The AP may decrement the count value of the first resource unit by one during a next TXOP (1108). In implementations for which the maximum count value is "15," the AP may decrement the count value of the first resource unit by one to "14." This process may continue until the wireless device has transmitted UL MU data on at least 15 different RUs, after which the count value of the first resource unit will return to zero. Thereafter, the AP may again allocate the first resource unit to the wireless device.

Figure 12:
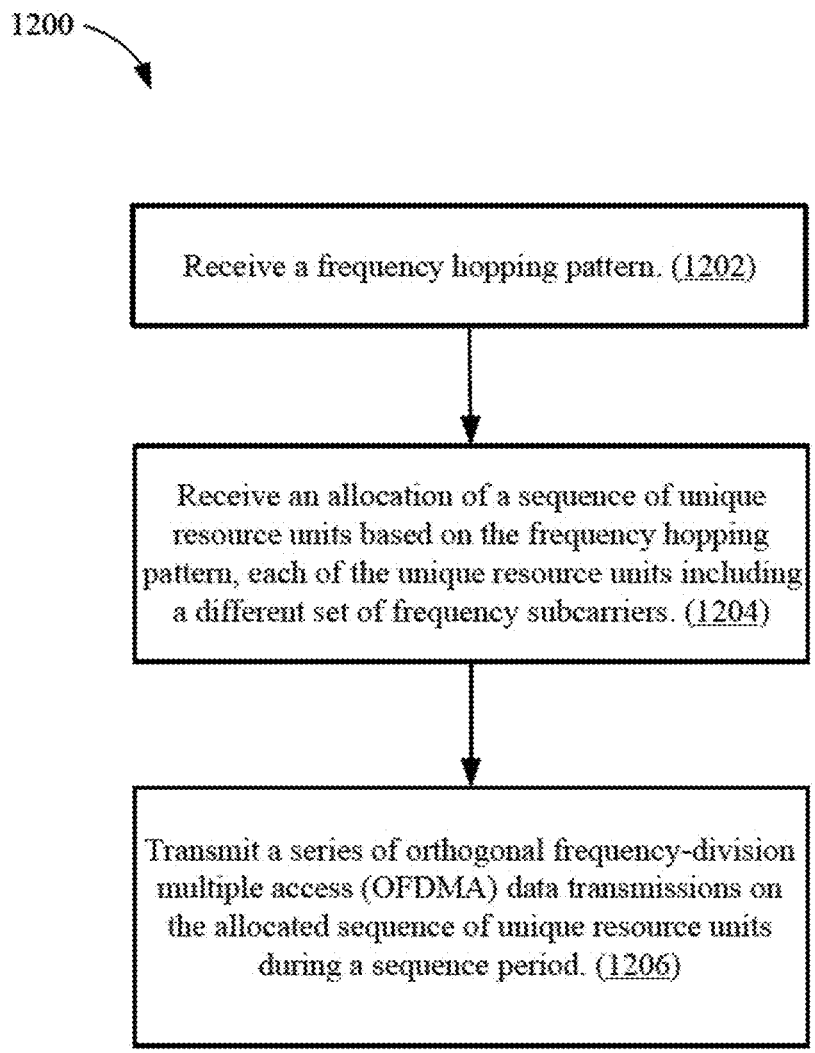
FIG. 12 shows an illustrative flow chart depicting an example operation for a wireless station transmitting data using resource units allocated based on a frequency hopping schedule.

FIG. 12 shows an illustrative flow chart depicting an example operation 1200 for a wireless station transmitting data using resource units allocated based on a frequency hopping schedule. For some implementations, the wireless station may be an example of one of the stations STA1-STA4 of FIG. 1 or the STA 200 of FIG. 2.

The wireless station may receive a frequency hopping pattern (1202), and may receive an allocation of a sequence of unique resource units based on the frequency hopping pattern, each of the unique resource units including a different set of frequency subcarriers (1204). The frequency hopping pattern may be based on governmental regulations indicating qualifications for a wireless station to be considered as a frequency hopping device. In some aspects, the frequency hopping pattern may indicate that the wireless station is to hop between 15 or more unique frequency bands during a time period. The frequency hopping pattern also may indicate a maximum dwell time on each of the unique frequency bands or may indicate that an accumulated dwell time in the unique frequency bands is to be no more than a time period greater than a duration of the frequency hopping sequence.

In some implementations, the wireless station may receive, from an access point (AP), a trigger frame that allocates the sequence of unique resource units to the wireless station and indicates that the wireless station is to successively frequency hop between more than a specified number of the unique resource units. In some aspects, the trigger frame also may include the frequency hopping pattern. In other aspects, the frequency hopping pattern may be broadcast in a beacon frame.

In addition, or in the alternative, the trigger frame may contain one of an indication that the wireless station is to dwell on each of the unique resource units for less than a duration and an indication that an accumulated dwell time in the unique resource units is to be no more than a time period greater than a duration of the sequence of unique resource units. In some aspects, the dwell time is 400 milliseconds, the time period is 15 milliseconds, and the sequence includes at least 15 unique resource units.

The wireless station may transmit a series of orthogonal frequency-division multiple access (OFDMA) data transmissions on the allocated sequence of unique resource units during a sequence period (1206). Each of the unique resource units may include a different set of frequency subcarriers, for example, so that multiple wireless stations can transmit uplink data at the same time. In some aspects, each of the unique resource units may be associated with a corresponding one of a series of transmit opportunities (TXOPs). Because the wireless station switches or "hops" between different resource units while sending a series of OFDMA data transmissions (such as to the AP) in a manner consistent with frequency hopping devices, the wireless station may qualify as a frequency hopping device and transmit signals at higher power levels associated with frequency hopping devices. In this manner, aspects of the present disclosure may increase the range of the wireless station.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for qualifying a wireless device compliant with one or more IEEE 802.11 standards as a frequency hopping device, comprising:
    determining a frequency hopping pattern, unique to the wireless device, that is compliant with applicable power spectral density limits imposed on frequency hopping devices;
    allocating a unique sequence of resource units to the wireless device based on the unique frequency hopping pattern, each of the resource units of the unique sequence including a different set of frequency subcarriers;
    transmitting, to the wireless device, a trigger frame that allocates the unique sequence of resource units to the wireless device and instructs the wireless device to successively frequency hop across the resource units of the unique sequence based on the unique frequency hopping pattern, wherein the unique frequency hopping pattern is included in at least one of a Common Info field of the trigger frame or an information element (IE) appended to the trigger frame; and
    receiving, from the wireless device, a series of uplink orthogonal frequency-division multiple access (OFDMA) transmissions on the unique sequence of resource units during a sequence period, wherein each of the resource units of the unique sequence is associated with a corresponding one of a series of transmit opportunities (TXOPs), and wherein the resource unit associated with a respective one of the TXOPs is not allocated to another wireless device during the respective TXOP.

2. The method of claim 1, wherein the trigger frame instructs the wireless device to frequency hop across the resource units of the unique sequence for at least the sequence period.

3. The method of claim 1, wherein the trigger frame contains one of an indication that the wireless device is to dwell on each of the resource units of the unique sequence for less than a duration and an indication that an accumulated dwell time in each of the resource units of the unique sequence is to be no more than a time period greater than a duration of the unique sequence of resource units.

4. The method of claim 3, wherein the dwell time is 400 milliseconds, the time period is 15 milliseconds, and the unique sequence includes at least 15 different resource units.

5. The method of claim 1, wherein the trigger frame contains a frequency hopping schedule indicating unique frequency hopping patterns for a plurality of wireless devices to concurrently transmit uplink data using OFDMA communications.

6. The method of claim 1, wherein the allocating comprises:
assigning, to each of a plurality of resource units, a count value initialized to zero;
allocating a first of the plurality of resource units to the wireless device for a first transmit opportunity (TXOP) if the count value assigned to the first resource unit is equal to zero;
resetting the count value assigned to the first resource unit to a maximum value after its allocation to the wireless device, wherein the maximum value is an integer greater than two;
decrementing the count value assigned to the first resource unit by one for each of a number of subsequent TXOPs; and
refraining from allocating the first resource unit to the wireless device until its assigned count value is equal to zero.

7. The method of claim 6, wherein the maximum value of the count value is based on a number of successive frequency hops associated with qualifying the wireless device as a frequency hopping device.

8. An access point (AP), comprising:
one or more processors; and
a memory storing instructions that, when executed by the one or more processors, cause the AP to qualify a wireless device compliant with one or more IEEE 802.11 standards as a frequency hopping device by:
determining a frequency hopping pattern, unique to the wireless device, that is compliant with applicable power spectral density limits imposed on frequency hopping devices;
allocating a unique sequence of resource units to the wireless device based on the unique frequency hopping pattern, each of the resource units of the unique sequence including a different set of frequency subcarriers;
transmitting, to the wireless device, a trigger frame that allocates the unique sequence of resource units to the wireless device and instructs the wireless device to successively frequency hop across the resource units of the unique sequence based on the unique frequency hopping pattern, wherein the unique frequency hopping pattern is included in at least one of a Common Info field of the trigger frame or an information element (IE) appended to the trigger frame; and
receiving, from the wireless device, a series of uplink orthogonal frequency-division multiple access (OFDMA) transmissions on the unique sequence of resource units during a sequence period, wherein each of the resource units of the unique sequence is associated with a corresponding one of a series of transmit opportunities (TXOPs), and wherein the resource unit associated with a respective one of the TXOPs is not allocated to another wireless device during the respective TXOP.

9. The AP of claim 8, wherein the trigger frame instructs the wireless device to frequency hop across the resource units of the unique sequence for at least the sequence period.

10. The AP of claim 8, wherein the trigger frame contains one of an indication that the wireless device is to dwell on each of the resource units of the unique sequence for less than a duration and an indication that an accumulated dwell time in each of the resource units of the unique sequence is to be no more than a time period greater than a duration of the unique sequence of resource units.

11. The AP of claim 10, wherein the dwell time is 400 milliseconds, the time period is 15 milliseconds, and the unique sequence includes at least 15 different resource units.

12. The AP of claim 8, wherein the trigger frame contains a frequency hopping schedule indicating unique frequency hopping patterns for a plurality of wireless devices to concurrently transmit uplink data using OFDMA communications.

13. The AP of claim 8, wherein execution of the instructions for allocating the sequence of unique resource units causes the AP to:
assign, to each of a plurality of resource units, a count value initialized to zero;
allocate a first of the plurality of resource units to the wireless device for a first transmit opportunity (TXOP) if the count value assigned to the first resource unit is equal to zero;
reset the count value assigned to the first resource unit to a maximum value after its allocation to the wireless device, wherein the maximum value is an integer greater than two;
decrement the count value assigned to the first resource unit by one for each of a number of subsequent TXOPs; and
refrain from allocating the first resource unit to the wireless device until its assigned count value is equal to zero.

14. A non-transitory computer-readable medium comprising instructions that, when executed by one or more processors of an access point (AP), cause the AP to qualify a wireless device compliant with one or more IEEE 802.11 standards as a frequency hopping device by performing operations comprising:
determining a frequency hopping pattern, unique to the wireless device, that is compliant with applicable power spectral density limits imposed on frequency hopping devices;
allocating a unique sequence of resource units to the wireless device based on the unique frequency hopping pattern, each of the resource units of the unique sequence including a different set of frequency subcarriers;
transmitting, to the wireless device, a trigger frame that allocates the unique sequence of resource units to the wireless device and instructs the wireless device to successively frequency hop across the resource units of the unique sequence based on the unique frequency hopping pattern, wherein the unique frequency hopping pattern is included in at least one of a Common Info field of the trigger frame or an information element (IE) appended to the trigger frame; and receiving, from the wireless device, a series of uplink orthogonal frequency-division multiple access (OFDMA) transmissions on the unique sequence of resource units during a sequence period, wherein each of the resource units of the unique sequence is associated with a corresponding one of a series of transmit opportunities (TXOPs), and wherein the resource unit associated with a respective one of the TXOPs is not allocated to another wireless device during the respective TXOP.

15. The non-transitory computer-readable medium of claim 14, wherein the trigger frame instructs the wireless device to frequency hop across the resource units of the unique sequence for at least the sequence period.

16. The non-transitory computer-readable medium of claim 14, wherein the trigger frame contains one of an indication that the wireless device is to dwell on each of the resource units of the unique sequence for less than a duration and an indication that an accumulated dwell time in each of the resource units of the unique sequence is to be no more than a time period greater than a duration of the unique sequence of resource units.

17. The non-transitory computer-readable medium of claim 16, wherein the dwell time is 400 milliseconds, the time period is 15 milliseconds, and the unique sequence includes at least 15 different resource units.

18. The non-transitory computer-readable medium of claim 14, wherein the trigger frame contains a frequency hopping schedule indicating unique frequency hopping patterns for a plurality of wireless devices to concurrently transmit uplink data using OFDMA communications.

19. The non-transitory computer-readable medium of claim 14, wherein execution of the instructions for allocating the sequence of unique resource units causes the AP to perform operations further comprising:

assigning, to each of a plurality of resource units, a count value initialized to zero;

allocating a first of the plurality of resource units to the wireless device for a first transmit opportunity (TXOP) if the count value assigned to the first resource unit is equal to zero;

resetting the count value assigned to the first resource unit to a maximum value after its allocation to the wireless device, wherein the maximum value is an integer greater than two;

decrementing the count value assigned to the first resource unit by one for each of a number of subsequent TXOPs; and refraining from allocating the first resource unit to the wireless device until its assigned count value is equal to zero.

20. A wireless station compliant with one or more IEEE 802.11 standards, the wireless station comprising:

one or more processors; and a memory storing instructions that, when executed by the one or more processors, cause the wireless station to qualify as a frequency hopping device by:

receiving a frequency hopping pattern, unique to the wireless station, that is compliant with applicable power spectral density limits imposed on frequency hopping devices;

receiving an allocation of a unique sequence of resource units based on the unique frequency hopping pattern, each of the resource units of the unique sequence including a different set of frequency subcarriers;

receive a trigger frame that allocates the unique sequence of resource units to the wireless station and instructs the wireless station to successively frequency hop across the resource units of the unique sequence based on the unique frequency hopping pattern, wherein the unique frequency hopping pattern is included in at least one of a Common Info field of the trigger frame or an information element (IE) appended to the trigger frame; and transmitting a series of orthogonal frequency-division multiple access (OFDMA) data transmissions on the unique sequence of resource units during a sequence period, wherein each of the resource units of the unique sequence is associated with a corresponding one of a series of transmit opportunities (TXOPs), and wherein the resource unit associated with a respective one of the TXOPs is not allocated to another wireless device during the respective TXOP.

21. The wireless station of claim 20, wherein the trigger frame contains one of an indication that the wireless station is to dwell on each of the resource units of the unique sequence for less than a duration and an indication that an accumulated dwell time in each of the resource units of the unique sequence is to be no more than a time period greater than a duration of the unique sequence of resource units.

22. The wireless station of claim 21, wherein the dwell time is 400 milliseconds, the time period is 15 milliseconds, and the unique sequence includes at least 15 different resource units.

23. The wireless station of claim 20, wherein the trigger frame contains a frequency hopping schedule indicating unique frequency hopping patterns for a plurality of wireless devices to concurrently transmit uplink data using OFDMA communications.

* * * * *